United States Patent
Smith

(10) Patent No.: US 7,430,407 B2
(45) Date of Patent: Sep. 30, 2008

(54) CIRCUITRY AND METHOD FOR PROCESSING RECEIVE SIGNALS OF A RECEIVE SYSTEM

(75) Inventor: Harry B Smith, Baltimore, MD (US)

(73) Assignee: APEX/ECLIPSE Systems, Inc., Baltimore, MD (US)

(*) Notice: Subject to any disclaimer, the term of this patent is extended or adjusted under 35 U.S.C. 154(b) by 0 days.

(21) Appl. No.: 11/594,062

(22) Filed: Nov. 8, 2006

(65) Prior Publication Data

US 2007/0054646 A1 Mar. 8, 2007

Related U.S. Application Data

(62) Division of application No. 11/145,215, filed on Jun. 6, 2005, which is a division of application No. 09/453,526, filed on Dec. 3, 1999, now Pat. No. 7,076,227.

(60) Provisional application No. 60/110,695, filed on Dec. 3, 1998.

(51) Int. Cl.
  *H04B 1/06* (2006.01)
  *H04B 7/08* (2006.01)
  *H04B 17/00* (2006.01)
  *H04B 1/00* (2006.01)

(52) U.S. Cl. .............. 455/278.1; 455/277.1; 455/132; 455/67.11

(58) Field of Classification Search ............. 455/278, 455/277, 132, 226.2, 278.1, 277.1, 226.3, 455/67.11, 63.1; 370/320; 375/272
See application file for complete search history.

(56) References Cited

U.S. PATENT DOCUMENTS

| | | | | |
|---|---|---|---|---|
| 4,539,689 A | * | 9/1985 | Chiu et al. | 375/231 |
| 5,140,702 A | * | 8/1992 | Laflin | 455/166.1 |
| 5,995,499 A | * | 11/1999 | Hottinen et al. | 370/337 |
| 6,058,318 A | * | 5/2000 | Kobayakawa et al. | 455/562.1 |
| 6,185,440 B1 | * | 2/2001 | Barratt et al. | 455/562.1 |
| 6,188,915 B1 | * | 2/2001 | Martin et al. | 455/562.1 |
| 6,201,955 B1 | * | 3/2001 | Jasper et al. | 455/277.2 |
| 6,236,862 B1 | * | 5/2001 | Erten et al. | 455/501 |
| 6,266,528 B1 | * | 7/2001 | Farzaneh | 455/423 |
| 6,330,431 B1 | * | 12/2001 | Rostamy et al. | 455/226.1 |

* cited by examiner

*Primary Examiner*—Tilahun B Gesessse
(74) *Attorney, Agent, or Firm*—Roylance, Abrams, Berdo & Goodman, L.L.P.

(57) ABSTRACT

A circuit for providing enhanced directivity in the form of a narrowed receive beam and a relatively small antenna with performance comparable to a much larger antenna at similar frequencies. Received signals are converted to digital values and stored in a manner which enables subsequent processing directed to improving the resolution of the received signals and to reduce the associated noise corresponding to the received data samples. The Signal-to-Noise ratio of the received data signals is improved as a result of processing techniques made possible by the configuration of the antenna and the digitally stored nature of the received data.

10 Claims, 22 Drawing Sheets

θ=Target Angle Relative to Array Broadside n=2
g=1

$$E_a(\theta) = \frac{\sin n\frac{\pi}{2} g \sin\theta}{n\frac{\pi}{2} g \sin\theta}$$

7x3 Array Used In Simulation

```
============= 0 dB ============ Trial  16 ============ I data ============
Contents of original I array
------ I values ------
 0.7349   1.4339   1.0919   0.7478   0.8836   1.7902   LEFT
 1.7061   2.3358   2.3004   2.2936   0.8836   1.2718   RIGHT
 0.5273   0.4199  -0.5505   2.1521   0.3127          CENTER 1.1123
  2.2319
  1.9065

After signs of right I elements reversed:
------ I values ------
1  0.7349   4 1.4339   7 0.8836  10 1.7061  13 -0.5273  16 -0.4199  19 -2.152*
2  1.3760   5 1.0919   8 0.3856  11 2.3004  14 -1.9065  17  0.5505  20 -0.312*
3  1.1123   6 0.7478   9 1.7902  12 2.3358  15 -2.2319  18 -2.2936  21 -1.271*

Sum 3.2232   3.2737   3.0593   6.3422   -4.6657   -2.1629   -3.734*
Avg 1.0744   1.0912   1.0198   2.1141   -1.5552   -0.7210   -1.245*
```

Block Diagram Iterative Processing Scheme

Regular & Reverse "Scans"

Composite "V" Scan & "A" Scan

| === I data === | | Group 1 | | | Noise Averages ### | | | | ### Avgs Scanned in Opposite Sense ### | | | | | | | | |

| | Min IA | -0.9v | -0.85v | -0.80v | -0.75v | -0.70v | -0.65v | -0.60v | -0.55v | -0.50v | -0.45v | -0.40v | -0.35v | -0.30v | -0.25v | -0.20v | -0.15v | -0.1v |
|---|---|---|---|---|---|---|---|---|---|---|---|---|---|---|---|---|---|---|
| Avg 20B | 0.041 | 1.206/-0.552 | 1.156/-0.502 | 1.106/-0.452 | 1.056/-0.402 | 1.006/-0.352 | 1.956/-0.302 | 0.906/-0.252 | 0.856/-0.202 | 0.806/-0.152 | 0.756/-0.102 | 0.706/-0.052 | 0.656/0.002 | 0.606/0.048 | 0.556/0.098 | 0.506/0.148 | 0.456/0.198 | 0.406/0.248 |
| Avg 21A | -0.052 | -0.691/-1.161 | 0.641/-1.111 | 0.591/-1.061 | 0.541/-1.011 | 0.491/-.961 | 0.441/-0.911 | 0.391/-0.861 | 0.341/-0.811 | 0.291/-0.761 | 0.241/-0.711 | 0.191/-0.661 | 0.141/-0.611 | 0.091/-0.561 | 0.041/-0.511 | 0.009/-0.461 | -0.059/-0.411 | -0.109/-0.361 |
| Avg 22A | 0.060 | 0.735/-1.005 | 0.685/-0.955 | 0.635/-0.905 | 0.585/-0.855 | 0.535/-0.805 | 0.485/-0.755 | 0.435/-0.705 | 0.385/-0.655 | 0.335/-0.605 | 0.285/-0.555 | 0.235/-0.505 | 0.185/-0.455 | 0.135/-0.405 | 0.085/-0.355 | 0.035/-0.305 | -0.015/-0.255 | -0.065/-0.205 |
| Avg 23A | 0.022 | 0.654/-1.124 | 0.604/-1.074 | 0.554/-1.024 | 0.504/-0.974 | 0.454/-0.924 | 0.404/-0.874 | 0.354/-0.824 | 0.304/-0.774 | 0.254/-0.724 | 0.204/-0.674 | 0.154/-0.624 | 0.104/-0.574 | 0.054/-0.524 | 0.004/-0.474 | -0.046/-0.424 | -0.096/-0.374 | -0.146/-0.324 |
| Avg 24A | -0.002 | 1.166/-0.637 | 1.116/-0.587 | 1.066/-0.537 | 1.016/-0.487 | 0.966/-0.437 | 0.916/-0.387 | 0.866/-0.337 | 0.816/-0.287 | 0.766/-0.237 | 0.716/-0.187 | 0.666/-0.137 | 0.616/-0.087 | 0.566/-0.037 | 0.516/0.013 | 0.466/0.063 | 0.416/0.113 | 0.366/0.163 |
| Avg 25B | -0.032 | 1.100/-0.732 | 1.050/-0.682 | 1.000/-0.632 | 0.950/-0.582 | 0.900/-0.532 | 0.850/-0.482 | 0.800/-0.432 | 0.750/-0.382 | 0.700/-0.332 | 0.650/-0.282 | 0.600/-0.232 | 0.550/-0.182 | 0.500/-0.132 | 0.450/-0.082 | 0.400/-0.032 | 0.350/0.018 | 0.300/0.068 |
| Avg 26B | 0.169 | 0.487/-1.481 | 0.437/-1.431 | 0.387/-1.381 | 0.337/-1.331 | 0.287/-1.281 | 0.237/-1.231 | 0.187/-1.181 | 0.137/-1.131 | 0.087/-1.081 | 0.037/-1.031 | -0.013/-0.981 | -0.063/-0.931 | -0.113/-0.881 | -0.163/-0.831 | -0.213/-0.781 | -0.263/-0.731 | -0.313/-0.681 |
| Avg 27A | 0.120 | 0.924/-0.756 | 0.874/-0.706 | 0.824/-0.656 | 0.774/-0.606 | 0.724/-0.556 | 0.674/-0.506 | 0.624/-0.456 | 0.574/-0.406 | 0.524/-0.356 | 0.474/-0.306 | 0.424/-0.256 | 0.374/-0.206 | 0.324/-0.156 | 0.274/-0.106 | 0.224/-0.056 | 0.174/-0.006 | 0.124/0.044 |
| Avg 28C | 0.178 | 0.782/-0.840 | 0.732/-0.790 | 0.682/-0.740 | 0.632/-0.690 | 0.582/-0.640 | 0.532/-0.590 | 0.482/-0.540 | 0.432/-0.490 | 0.382/-0.440 | 0.332/-0.390 | 0.282/-0.340 | 0.232/-0.290 | 0.182/-0.240 | 0.132/-0.190 | 0.082/-0.140 | 0.032/-0.090 | 0.018/-0.040 |
| Avg 29C | 0.129 | 1.246/-0.683 | 1.196/-0.633 | 1.146/-0.583 | 1.096/-0.533 | 1.046/-0.483 | 0.996/-0.433 | 0.946/-0.383 | 0.896/-0.333 | 0.846/-0.283 | 0.796/-0.233 | 0.746/-0.183 | 0.696/-0.133 | 0.646/-0.083 | 0.596/-0.033 | 0.546/0.017 | 0.496/0.067 | 0.446/0.117 |
| Avg 30B | 0.032 | 0.848/-0.921 | 0.798/-0.871 | 0.748/-0.821 | 0.698/-0.771 | 0.648/-0.721 | 0.598/-0.671 | 0.548/-0.621 | 0.498/-0.571 | 0.448/-0.521 | 0.398/-0.471 | 0.348/-0.421 | 0.298/-0.371 | 0.248/-0.321 | 0.198/-0.271 | 0.148/-0.221 | 0.098/-0.171 | 0.048/-0.121 |
| Avg 31C | 0.174 | 0.786/-1.187 | 0.736/-1.137 | 0.686/-1.087 | 0.636/-0.037 | 0.586/-0.987 | 0.536/-0.937 | 0.486/-0.887 | 0.436/-0.837 | 0.386/-0.787 | 0.336/-0.737 | 0.286/-0.687 | 0.236/-0.637 | 0.186/-0.587 | 0.136/-0.537 | 0.086/-0.487 | 0.036/-0.437 | 0.014/-0.387 |
| Avg 32C | -0.015 | 1.060/-0.755 | 1.010/-0.705 | 0.960/-0.655 | 0.910/-0.605 | 0.860/-0.555 | 0.810/-0.505 | 0.760/-0.455 | 0.710/-0.405 | 0.660/-0.355 | 0.610/-0.305 | 0.560/-0.255 | 0.510/-0.205 | 0.460/-0.155 | 0.410/-0.105 | 0.360/-0.055 | 0.310/-0.005 | 0.260/0.045 |
| Avg 33C | -0.080 | 0.993/-0.887 | 0.943/-0.837 | 0.893/-0.787 | 0.843/-0.737 | 0.793/-0.687 | 0.743/-0.637 | 0.693/-0.587 | 0.643/-0.537 | 0.593/-0.487 | 0.543/-0.437 | 0.493/-0.387 | 0.443/-0.337 | 0.393/-0.287 | 0.343/-0.237 | 0.393/-0.187 | 0.243/-0.137 | 0.193/-0.087 |
| Avg 34A | 0.203 | 0.530/-1.479 | 0.480/-1.429 | 0.430/-1.379 | 0.380/-1.329 | 0.330/-1.279 | 0.280/-1.229 | 0.230/-1.179 | 0.180/-1.129 | 0.130/-1.079 | 0.080/-1.029 | 0.030/-0.979 | -0.020/-0.929 | -0.070/-0.879 | -0.120/-0.829 | -0.170/-0.779 | -0.220/-0.729 | -0.270/-0.679 |
| Avg 35C | -0.083 | 1.035/-0.848 | 0.985/-0.798 | 0.935/-0.748 | 0.885/-0.698 | 0.835/-0.648 | 0.785/-0.598 | 0.735/-0.548 | 0.685/-0.498 | 0.635/-0.448 | 0.585/-0.398 | 0.535/-0.348 | 0.485/-0.298 | 0.435/-0.248 | 0.385/-0.198 | 0.335/-0.148 | 0.285/-0.098 | 0.235/-0.048 |
| Avg 36B | 0.212 | 1.171/-0.841 | 1.121/-0.791 | 1.071/-0.741 | 1.021/-0.691 | 0.971/-0.641 | 0.921/-0.591 | 0.871/-0.541 | 0.821/-0.491 | 0.771/-0.441 | 0.721/-0.391 | 0.671/-0.341 | 0.621/-0.291 | 0.571/-0.241 | 0.521/-0.191 | 0.471/-0.141 | 0.421/-0.091 | 0.371/-0.041 |
| Avg 37C | 0.015 | 1.024/-0.761 | 0.974/-0.711 | 0.924/-0.661 | 0.874/-0.611 | 0.824/-0.561 | 0.774/-0.511 | 0.724/-0.461 | 0.674/-0.411 | 0.624/-0.361 | 0.574/-0.311 | 0.524/-0.261 | 0.474/-0.211 | 0.424/-0.161 | 0.374/-0.111 | 0.324/-0.061 | 0.274/-0.011 | 0.224/0.039 |
| Avg 38B | 0.003 | 0.616/-1.181 | 0.566/-1.131 | 0.516/-1.081 | 0.466/-1.031 | 0.416/-0.981 | 0.366/-0.931 | 0.316/-0.881 | 0.266/-0.831 | 0.216/-0.781 | 0.166/-0.731 | 0.116/-0.681 | 0.066/-0.631 | 0.016/-0.581 | -0.034/-0.531 | -0.084/-0.481 | -0.134/-0.431 | -0.184/-0.381 |

FIG. 12 A

| === I data === | | | | | | | Group 1 | | ### Noise Averages ### | | | | | | | | |
|---|---|---|---|---|---|---|---|---|---|---|---|---|---|---|---|---|---|
| -0.05V | 0.00V | 0.05V | 0.10V | 0.15V | 0.20V | 0.25V | 0.30V | 0.35V | 0.40V | 0.45V | 0.50V | 0.55V | 0.60V | 0.65V | 0.70V | 0.75V |
| 0.356 | 0.306 | 0.256 | 0.206 | 0.156 | 0.106 | 0.056 | 0.006 | -0.044 | -0.094 | -0.144 | -0.194 | -0.244 | -0.294 | -0.344 | -0.394 | -0.444 |
| 0.298 | 0.348 | 0.398 | 0.448 | 0.498 | 0.548 | 0.598 | 0.648 | 0.698 | 0.748 | 0.798 | 0.848 | 0.898 | 0.948 | 0.998 | 1.048 | 1.098 |
| -0.159 | -0.209 | -0.259 | -0.309 | -0.359 | -0.409 | -0.459 | -0.509 | -0.559 | 0.609 | -0.659 | -0.709 | -0.759 | -0.809 | -0.859 | -0.909 | -0.959 |
| -0.311 | -0.261 | -0.211 | -0.161 | -0.111 | -0.061 | -0.011 | 0.039 | 0.089 | 0.139 | 0.189 | 0.239 | 0.289 | 0.339 | 0.389 | 0.439 | 0.489 |
| -0.115 | -0.165 | -0.215 | -0.265 | -0.315 | -0.365 | -0.415 | -0.465 | -0.515 | -0.565 | -0.615 | -0.665 | -0.715 | -0.765 | -0.815 | -0.865 | -0.915 |
| -0.155 | -0.105 | -0.055 | -0.005 | 0.045 | 0.095 | 0.145 | 0.195 | 0.245 | 0.295 | 0.315 | 0.395 | 0.445 | 0.495 | 0.545 | 0.595 | 0.645 |
| -0.196 | -0.246 | -0.296 | -0.346 | -0.396 | -0.446 | -0.496 | -0.546 | -0.596 | -0.646 | -0.696 | -0.746 | -0.796 | -0.846 | -0.896 | -0.946 | -0.996 |
| -0.274 | -0.224 | -0.174 | -0.124 | -0.074 | -0.024 | 0.026 | 0.076 | 0.126 | 0.176 | 0.226 | 0.276 | 0.326 | 0.376 | 0.426 | 0.476 | 0.526 |
| 0.316 | 0.266 | 0.216 | 0.166 | 0.116 | 0.066 | 0.016 | -0.034 | -0.084 | -0.134 | -0.184 | -0.234 | -0.284 | -0.334 | -0.384 | -0.434 | -0.484 |
| 0.213 | 0.263 | 0.313 | 0.363 | 0.413 | 0.463 | 0.513 | 0.563 | 0.613 | 0.663 | 0.713 | 0.763 | 0.813 | 0.863 | 0.913 | 0.963 | 1.013 |
| 0.250 | 0.200 | 0.150 | 0.100 | 0.050 | 0.000 | -0.050 | -0.100 | -0.150 | -0.200 | -0.250 | -0.300 | -0.350 | -0.400 | -0.450 | -0.500 | -0.550 |
| 0.118 | 0.168 | 0.218 | 0.268 | 0.318 | 0.368 | 0.418 | 0.468 | 0.518 | 0.568 | 0.618 | 0.668 | 0.718 | 0.768 | 0.818 | 0.868 | 0.918 |
| -0.363 | -0.413 | -0.463 | -0.513 | -0.563 | -0.613 | -0.663 | -0.713 | -0.763 | -0.813 | -0.863 | -0.913 | -0.963 | -1.013 | -1.063 | -1.113 | -1.163 |
| -0.631 | -0.581 | -0.531 | -0.481 | -0.431 | -0.381 | -0.331 | -0.281 | -0.231 | -0.181 | -0.131 | -0.081 | -0.031 | 0.019 | 0.069 | 0.119 | 0.169 |
| 0.074 | 0.024 | -0.026 | -0.076 | -0.126 | -0.176 | -0.226 | -0.276 | -0.326 | -0.376 | -0.426 | -0.476 | -0.526 | -0.576 | -0.626 | -0.676 | -0.726 |
| 0.094 | 0.144 | 0.194 | 0.244 | 0.294 | 0.344 | 0.394 | 0.444 | 0.484 | 0.544 | 0.594 | 0.644 | 0.684 | 0.744 | 0.784 | 0.844 | 0.884 |
| -0.068 | -0.118 | -0.168 | -0.218 | -0.268 | -0.318 | -0.368 | -0.418 | -0.468 | -0.518 | -0.568 | -0.618 | -0.668 | -0.718 | -0.768 | -0.818 | -0.868 |
| 0.010 | 0.060 | 0.110 | 0.160 | 0.210 | 0.260 | 0.310 | 0.360 | 0.410 | 0.460 | 0.510 | 0.560 | 0.610 | 0.660 | 0.710 | 0.760 | 0.810 |
| 0.396 | 0.346 | 0.296 | 0.246 | 0.196 | 0.146 | 0.096 | 0.046 | 0.004 | -0.054 | -0.104 | -0.154 | -0.204 | -0.254 | -0.304 | -0.354 | -0.404 |
| 0.167 | 0.217 | 0.267 | 0.317 | 0.367 | 0.417 | 0.467 | 0.517 | 0.567 | 0.617 | 0.667 | 0.717 | 0.767 | 0.817 | 0.867 | 0.917 | 0.967 |
| 0.002 | -0.052 | -0.102 | -0.152 | -0.202 | -0.252 | -0.302 | -0.352 | -0.402 | -0.452 | -0.502 | -0.552 | -0.602 | -0.652 | -0.702 | -0.752 | -0.802 |
| -0.071 | -0.021 | 0.029 | 0.079 | 0.129 | 0.179 | 0.229 | 0.279 | 0.329 | 0.379 | 0.429 | 0.479 | 0.529 | 0.579 | 0.629 | 0.679 | 0.729 |
| -0.064 | -0.114 | -0.164 | -0.214 | -0.264 | -0.314 | -0.364 | -0.414 | -0.464 | -0.514 | -0.564 | -0.614 | -0.664 | -0.714 | -0.764 | -0.814 | -0.864 |
| -0.337 | -0.287 | -0.237 | -0.187 | -0.137 | -0.087 | -0.037 | 0.013 | 0.063 | 0.113 | 0.163 | 0.213 | 0.263 | 0.313 | 0.363 | 0.413 | 0.463 |
| 0.210 | 0.160 | 0.110 | 0.060 | 0.010 | -0.040 | -0.090 | -0.140 | -0.190 | -0.240 | -0.290 | -0.340 | -0.390 | -0.440 | -0.490 | -0.540 | -0.590 |
| 0.095 | 0.145 | 0.195 | 0.245 | 0.295 | 0.345 | 0.395 | 0.445 | 0.495 | 0.545 | 0.595 | 0.645 | 0.695 | 0.745 | 0.795 | 0.845 | 0.895 |
| 0.143 | 0.093 | 0.043 | 0.007 | -0.057 | -0.107 | -0.157 | -0.207 | -0.257 | -0.307 | -0.357 | -0.407 | -0.457 | -0.507 | -0.557 | -0.607 | -0.657 |
| -0.037 | 0.013 | 0.063 | 0.113 | 0.163 | 0.213 | 0.263 | 0.313 | 0.363 | 0.413 | 0.463 | 0.513 | 0.563 | 0.613 | 0.663 | 0.713 | 0.763 |
| -0.320 | -0.370 | -0.420 | -0.470 | -0.520 | -0.570 | -0.620 | -0.670 | -0.720 | -0.770 | -0.820 | -0.870 | -0.920 | -0.970 | -1.020 | -1.070 | -1.120 |
| -0.629 | -0.579 | -0.529 | -0.479 | -0.429 | -0.379 | -0.329 | -0.279 | -0.229 | -0.179 | -0.129 | -0.079 | -0.029 | 0.021 | 0.071 | 0.121 | 0.171 |
| 0.185 | 0.135 | 0.085 | 0.035 | 0.015 | -0.065 | -0.115 | -0.165 | -0.215 | -0.265 | -0.315 | -0.365 | -0.415 | -0.465 | -0.515 | -0.565 | -0.615 |
| 0.002 | 0.052 | 0.102 | 0.152 | 0.202 | 0.252 | 0.302 | 0.352 | 0.402 | 0.452 | 0.502 | 0.552 | 0.602 | 0.652 | 0.702 | 0.752 | 0.802 |
| 0.321 | 0.271 | 0.221 | 0.171 | 0.121 | 0.071 | 0.021 | -0.029 | -0.079 | -0.129 | -0.179 | -0.229 | -0.279 | -0.329 | -0.379 | -0.429 | -0.479 |
| 0.009 | 0.059 | 0.109 | 0.159 | 0.209 | 0.259 | 0.309 | 0.359 | 0.409 | 0.459 | 0.509 | 0.559 | 0.609 | 0.659 | 0.709 | 0.759 | 0.809 |
| 0.174 | 0.124 | 0.074 | 0.024 | -0.026 | -0.076 | -0.126 | -0.176 | -0.226 | -0.276 | -0.326 | -0.376 | -0.426 | -0.476 | -0.526 | -0.576 | -0.626 |
| 0.089 | 0.139 | 0.189 | 0.239 | 0.289 | 0.339 | 0.389 | 0.439 | 0.489 | 0.539 | 0.589 | 0.639 | 0.689 | 0.739 | 0.789 | 0.839 | 0.889 |
| -0.234 | -0.284 | -0.334 | -0.384 | -0.434 | -0.484 | -0.534 | -0.584 | -0.634 | -0.684 | -0.734 | -0.784 | -0.834 | -0.884 | -0.934 | -0.984 | -1.034 |
| -0.331 | -0.281 | -0.231 | -0.181 | -0.131 | -0.081 | -0.031 | 0.019 | 0.069 | 0.119 | 0.169 | 0.219 | 0.269 | 0.319 | 0.369 | 0.419 | 0.469 |

FIG. 12 B

| === I data === | 0 dB === | Group 1 | | | | Average I Values | | | | ### Avgs Scanned in Opposite Sense ### | | | | | | | |

| | Min IA | -.9v | -.85v | -.8v | -.75v | -.7v | -.65v | -.6v | -.55v | -.5v | -.45v | -.4v | -.35v | -.3v | -.25v | -.2v | -.15v | -.1v |
|---|---|---|---|---|---|---|---|---|---|---|---|---|---|---|---|---|---|---|
| Avg 20B | 0.041 | 2.431 0.672 | 2.381 0.722 | 2.331 0.772 | 2.281 0.822 | 2.231 0.872 | 2.181 0.922 | 2.131 0.972 | 2.081 1.022 | 2.031 1.072 | 1.981 1.122 | 1.931 1.172 | 1.881 1.222 | 1.831 1.272 | 1.781 1.322 | 1.731 1.372 | 1.681 1.422 | 1.631 1.472 |
| Avg 21A | -0.052 | 1.916 0.064 | 1.866 0.114 | 1.816 0.164 | 1.766 0.214 | 1.716 0.264 | 1.666 0.314 | 1.616 0.364 | 1.566 0.414 | 1.516 0.464 | 1.466 0.514 | 1.416 0.564 | 1.366 0.614 | 1.316 0.664 | 1.266 0.714 | 1.216 0.764 | 1.166 0.814 | 1.116 0.864 |
| Avg 22A | 0.060 | 1.960 0.220 | 1.910 0.270 | 1.860 0.320 | 1.810 0.370 | 1.760 0.420 | 1.710 0.470 | 1.660 0.520 | 1.610 0.570 | 1.560 0.620 | 1.510 0.670 | 1.460 0.720 | 1.410 0.770 | 1.360 0.820 | 1.310 0.870 | 1.260 0.920 | 1.210 0.970 | 1.160 1.020 |
| Avg 23A | 0.022 | 1.878 0.101 | 1.828 0.151 | 1.778 0.201 | 1.728 0.251 | 1.678 0.301 | 1.628 0.351 | 1.578 0.401 | 1.528 0.451 | 1.478 0.501 | 1.428 0.551 | 1.378 0.601 | 1.328 0.651 | 1.278 0.701 | 1.228 0.751 | 1.178 0.801 | 1.128 0.851 | 1.078 0.901 |
| Avg 24A | -0.002 | 2.390 0.588 | 2.340 0.638 | 2.290 0.688 | 2.240 0.738 | 2.190 0.788 | 2.140 0.838 | 2.090 0.888 | 2.040 0.938 | 1.990 0.988 | 1.940 1.038 | 1.890 1.088 | 1.840 1.138 | 1.790 1.188 | 1.740 1.238 | 1.690 1.288 | 1.640 1.338 | 1.590 1.388 |
| Avg 25B | -0.032 | 2.325 0.493 | 2.275 0.543 | 2.225 0.593 | 2.175 0.643 | 2.125 0.693 | 2.075 0.743 | 2.025 0.793 | 1.975 0.843 | 1.925 0.893 | 1.875 0.943 | 1.825 0.993 | 1.775 1.043 | 1.725 1.093 | 1.675 1.143 | 1.625 1.193 | 1.575 1.243 | 1.525 1.293 |
| Avg 26B | -0.169 | 1.712 -0.257 | 1.662 -0.207 | 1.612 -0.157 | 1.562 -0.107 | 1.512 -0.057 | 1.462 -0.007 | 1.412 0.043 | 1.362 0.093 | 1.312 0.143 | 1.262 0.193 | 1.212 0.243 | 1.162 0.293 | 1.112 0.343 | 1.062 0.393 | 0.012 0.443 | 0.962 0.493 | 0.912 0.543 |
| Avg 27A | 0.120 | 2.149 0.468 | 2.099 0.518 | 2.049 0.568 | 1.999 0.618 | 1.949 0.668 | 1.899 0.718 | 1.849 0.768 | 1.799 0.818 | 1.749 0.868 | 1.699 0.918 | 1.649 0.968 | 1.599 1.018 | 1.549 1.068 | 1.499 1.118 | 1.449 1.168 | 1.399 1.218 | 1.349 1.268 |
| Avg 28C | 0.178 | 2.007 0.385 | 1.957 0.435 | 1.907 0.485 | 1.857 0.535 | 1.807 0.585 | 1.757 0.635 | 1.707 0.685 | 1.657 0.735 | 1.607 0.785 | 1.557 0.835 | 1.507 0.885 | 1.457 0.935 | 1.407 0.985 | 1.357 1.035 | 1.307 1.085 | 1.257 1.135 | 1.207 1.185 |
| Avg 29C | -0.129 | 2.471 0.542 | 2.421 0.592 | 2.371 0.642 | 2.321 0.692 | 2.271 0.742 | 2.221 0.792 | 2.171 0.842 | 2.121 0.892 | 2.071 0.942 | 2.021 0.992 | 1.971 1.042 | 1.921 1.092 | 1.871 1.142 | 1.821 1.192 | 1.771 1.242 | 1.721 1.292 | 1.671 1.342 |
| Avg 30B | 0.032 | 2.073 0.304 | 2.023 0.354 | 1.973 0.404 | 1.923 0.454 | 1.873 0.504 | 1.823 0.554 | 1.773 0.604 | 1.723 0.654 | 1.673 0.704 | 1.623 0.754 | 1.573 0.804 | 1.523 0.854 | 1.473 0.904 | 1.423 0.954 | 1.373 1.004 | 1.323 1.054 | 1.273 1.104 |
| Avg 31C | -0.174 | 2.011 0.037 | 1.961 0.087 | 1.911 0.137 | 1.861 0.187 | 1.811 0.237 | 1.761 0.287 | 1.711 0.337 | 1.661 0.387 | 1.611 0.437 | 1.561 0.487 | 1.511 0.537 | 1.461 0.587 | 1.411 0.637 | 1.361 0.687 | 1.311 0.737 | 1.261 0.787 | 1.211 0.837 |
| Avg 32C | -0.015 | 2.285 0.470 | 2.235 0.520 | 2.185 0.570 | 2.135 0.620 | 2.085 0.670 | 2.035 0.720 | 1.985 0.770 | 1.935 0.820 | 1.885 0.870 | 1.835 0.920 | 1.785 0.970 | 1.735 1.020 | 1.685 1.070 | 1.635 1.120 | 1.585 1.170 | 1.535 1.220 | 1.485 1.270 |
| Avg 33C | -0.080 | 2.218 0.338 | 2.168 0.388 | 2.118 0.438 | 2.068 0.488 | 2.018 0.538 | 1.968 0.588 | 1.918 0.638 | 1.868 0.688 | 1.818 0.738 | 1.768 0.788 | 1.718 0.838 | 1.668 0.888 | 1.618 0.938 | 1.568 0.988 | 1.518 1.038 | 1.468 1.088 | 1.418 1.138 |
| Avg 34A | -0.209 | 1.755 -0.255 | 1.705 -0.205 | 1.655 -0.155 | 1.605 -0.105 | 1.555 -0.055 | 1.505 -0.005 | 1.455 0.045 | 1.405 0.095 | 1.355 0.145 | 1.305 0.195 | 1.255 0.245 | 1.205 0.295 | 1.155 0.345 | 1.105 0.395 | 1.055 0.445 | 1.005 0.495 | 0.955 0.545 |
| Avg 35C | -0.083 | 2.260 0.377 | 2.210 0.427 | 2.160 0.477 | 2.110 0.527 | 2.060 0.577 | 2.010 0.627 | 1.960 0.677 | 1.910 0.727 | 1.860 0.777 | 1.810 0.827 | 1.760 0.877 | 1.710 0.927 | 1.660 0.977 | 1.610 1.027 | 1.560 1.077 | 1.510 1.127 | 1.460 1.177 |
| Avg 36B | -0.212 | 2.396 0.384 | 2.346 0.434 | 2.296 0.484 | 2.246 0.534 | 2.196 0.584 | 2.146 0.634 | 2.096 0.684 | 2.046 0.734 | 1.996 0.784 | 1.946 0.834 | 1.896 0.884 | 1.846 0.934 | 1.796 0.984 | 1.746 1.034 | 1.696 1.084 | 1.646 1.134 | 1.596 1.184 |
| Avg 37C | 0.015 | 2.249 0.463 | 2.199 0.513 | 2.149 0.563 | 2.099 0.613 | 2.049 0.663 | 1.999 0.713 | 1.949 0.763 | 1.899 0.813 | 1.849 0.863 | 1.799 0.913 | 1.749 0.963 | 1.699 1.013 | 1.649 1.063 | 1.599 1.113 | 1.549 1.163 | 1.499 1.213 | 1.449 1.263 |
| Avg 38B | 0.003 | 1.841 0.044 | 1.791 0.094 | 1.741 0.144 | 1.691 0.194 | 1.641 0.244 | 1.591 0.294 | 1.541 0.344 | 1.491 0.394 | 1.441 0.444 | 1.391 0.494 | 1.341 0.544 | 1.291 0.594 | 1.241 0.644 | 1.191 0.694 | 1.141 0.744 | 1.091 0.794 | 1.041 0.844 |

FIG. 12 C

| === I data === | 0 dB === | Group 1 | | | Average I Values | | | | | | | | | | | |
|---|---|---|---|---|---|---|---|---|---|---|---|---|---|---|---|---|

| -.05 V | 0 V | .05 V | .1 V | .15 V | .2 V | .25 V | .3 V | .35 V | .4 V | .45 V | .5 V | .55 V | .6 V | .65 V | .7 V | .75 V |
|---|---|---|---|---|---|---|---|---|---|---|---|---|---|---|---|---|
| 1.581 1.522 | 1.531 1.572 | 1.481 1.622 | 1.431 1.672 | 1.381 1.722 | 1.331 1.772 | 1.281 1.822 | 1.231 1.872 | 1.181 1.922 | 1.131 1.972 | 1.081 2.022 | 1.031 2.072 | 0.981 2.122 | 0.931 2.172 | 0.861 2.222 | 0.831 2.272 | 0.781 2.322 |
| 1.066 0.914 | 1.016 0.964 | 0.966 1.014 | 0.916 1.064 | 0.866 1.114 | 0.816 1.164 | 0.766 1.214 | 0.716 1.264 | 0.666 1.314 | 1.616 1.364 | 0.566 1.414 | 0.516 1.464 | 0.466 1.514 | 0.416 1.564 | 0.366 1.614 | 0.316 1.664 | 0.266 1.714 |
| 1.110 1.070 | 1.060 1.120 | 1.010 1.170 | 0.960 1.220 | 0.910 1.270 | 0.860 1.320 | 0.810 1.370 | 0.760 1.420 | 0.710 1.470 | 0.660 1.520 | 0.610 1.570 | 0.560 1.620 | 0.510 1.670 | 0.460 1.720 | 0.410 1.770 | 0.360 1.820 | 0.310 1.870 |
| 1.028 0.951 | 0.978 1.001 | 0.928 1.051 | 0.878 1.101 | 0.828 1.151 | 0.778 1.201 | 0.728 1.251 | 0.678 1.301 | 0.628 1.351 | 0.578 1.401 | 0.528 1.451 | 0.478 1.501 | 0.428 1.551 | 0.378 1.601 | 0.328 1.651 | 0.278 1.701 | 0.228 1.751 |
| 1.540 1.438 | 1.490 1.488 | 1.440 1.538 | 1.390 1.588 | 1.340 1.638 | 1.290 1.688 | 1.240 1.738 | 1.190 1.788 | 1.140 1.838 | 1.090 1.888 | 1.040 1.938 | 0.990 1.988 | 0.940 2.038 | 0.890 2.088 | 0.840 2.138 | 0.790 2.188 | 0.740 2.238 |
| 1.475 1.343 | 1.425 1.393 | 1.375 1.443 | 1.325 1.493 | 1.275 1.543 | 1.225 1.593 | 1.175 1.643 | 1.125 1.693 | 1.075 1.743 | 1.025 1.793 | 0.975 1.843 | 0.925 1.893 | 0.875 1.943 | 0.825 1.993 | 0.775 2.043 | 0.725 2.093 | 0.675 2.143 |
| 0.862 0.593 | 0.812 0.643 | 0.762 0.693 | 0.712 0.743 | 0.662 0.793 | 0.612 0.843 | 0.562 0.893 | 0.512 0.943 | 0.462 0.993 | 0.412 1.043 | 0.362 1.093 | 0.312 1.143 | 0.262 1.193 | 0.212 1.243 | 0.162 1.293 | 0.112 1.343 | 0.062 1.393 |
| 1.299 1.318 | 1.249 1.368 | 1.199 1.418 | 1.149 1.468 | 1.093 1.518 | 1.049 1.568 | 0.999 1.618 | 0.949 1.668 | 0.899 1.718 | 0.849 1.768 | 0.799 1.818 | 0.749 1.868 | 0.699 1.918 | 0.649 1.968 | 0.599 2.018 | 0.549 2.068 | 0.499 2.118 |
| 1.157 1.235 | 1.107 1.285 | 1.057 1.335 | 1.007 1.385 | 0.957 1.435 | 0.907 1.485 | 0.857 1.535 | 0.807 1.585 | 0.757 1.635 | 0.707 1.685 | 0.657 1.735 | 0.607 1.785 | 0.557 1.835 | 0.507 1.885 | 0.457 1.935 | 0.407 1.985 | 0.357 2.035 |
| 1.621 1.392 | 1.571 1.442 | 1.521 1.492 | 1.471 1.542 | 1.421 1.592 | 1.371 1.642 | 1.321 1.692 | 1.271 1.742 | 1.221 1.792 | 1.171 1.842 | 1.121 1.892 | 1.071 1.942 | 1.021 1.992 | 0.971 2.042 | 0.921 2.092 | 0.871 2.142 | 0.821 2.192 |
| 1.223 1.154 | 1.173 1.204 | 1.123 1.254 | 1.073 1.304 | 1.023 1.354 | 0.973 1.404 | 0.923 1.454 | 0.873 1.504 | 0.823 1.554 | 0.773 1.604 | 0.723 1.654 | 0.673 1.704 | 0.623 1.754 | 0.573 1.804 | 0.523 1.854 | 0.473 1.904 | 0.423 1.954 |
| 1.161 0.887 | 1.111 0.937 | 1.061 0.987 | 1.011 1.037 | 0.961 1.087 | 0.911 1.137 | 0.861 1.187 | 0.811 1.237 | 0.761 1.287 | 0.711 1.337 | 0.661 1.387 | 0.611 1.437 | 0.561 1.487 | 0.511 1.537 | 0.461 1.587 | 0.411 1.637 | 0.361 1.687 |
| 1.435 1.320 | 1.385 1.370 | 1.335 1.420 | 1.285 1.470 | 1.235 1.520 | 1.185 1.570 | 1.135 1.620 | 1.085 1.670 | 1.035 1.720 | 0.985 1.770 | 0.935 1.820 | 0.885 1.870 | 0.835 1.920 | 0.785 1.970 | 0.735 2.020 | 0.685 2.070 | 0.635 2.120 |
| 1.368 1.188 | 1.318 1.238 | 1.268 1.288 | 1.218 1.338 | 1.168 1.388 | 1.118 1.438 | 1.068 1.488 | 1.018 1.538 | 0.968 1.588 | 0.918 1.638 | 0.868 1.688 | 0.818 1.738 | 0.768 1.788 | 0.718 1.838 | 0.668 1.888 | 0.618 1.938 | 0.568 1.988 |
| 0.905 0.595 | 0.855 0.645 | 0.805 0.695 | 0.755 0.745 | 0.705 0.795 | 0.655 0.845 | 0.605 0.895 | 0.555 0.945 | 0.505 0.995 | 0.455 1.045 | 0.405 1.095 | 0.355 1.145 | 0.305 1.195 | 0.255 1.245 | 0.205 1.295 | 0.155 1.345 | 0.105 1.395 |
| 1.410 1.227 | 1.360 1.277 | 1.310 1.327 | 1.260 1.377 | 1.210 1.427 | 1.160 1.477 | 1.110 1.527 | 1.060 1.577 | 1.010 1.627 | 0.960 1.677 | 0.910 1.727 | 0.860 1.777 | 0.810 1.827 | 0.760 1.877 | 0.710 1.927 | 0.660 1.977 | 0.610 2.027 |
| 1.546 1.234 | 1.496 1.284 | 1.446 1.334 | 1.396 1.384 | 1.346 1.434 | 1.296 1.484 | 1.246 1.534 | 1.196 1.584 | 1.146 1.634 | 1.096 1.684 | 1.046 1.734 | 0.996 1.784 | 0.946 1.834 | 0.896 1.884 | 0.846 1.934 | 0.796 1.984 | 0.746 2.034 |
| 1.399 1.313 | 1.349 1.363 | 1.299 1.413 | 1.249 1.463 | 1.199 1.513 | 1.149 1.563 | 1.099 1.613 | 1.049 1.663 | 0.999 1.713 | 0.949 1.763 | 0.899 1.813 | 0.849 1.863 | 0.799 1.913 | 0.749 1.963 | 0.699 2.013 | 0.649 2.063 | 0.599 2.113 |
| 0.991 0.894 | 0.941 0.944 | 0.891 0.994 | 0.841 1.044 | 0.791 1.094 | 0.741 1.144 | 0.691 1.194 | 0.641 1.244 | 0.591 1.294 | 0.541 1.344 | 0.491 1.394 | 0.441 1.444 | 0.391 1.494 | 0.341 1.544 | 0.291 1.594 | 0.241 1.644 | 0.191 1.694 |

RANDOM 1 data

| Trial Group | Orig Noise Avg | New Noise Average | | | | | Equiv Voltage Added | Last Noise Avg | Ratio Orig Last |
|---|---|---|---|---|---|---|---|---|---|
| | | 1 | 2 | 3 | 4 | 5 | | | |
| 205 1 | 0.1481 | 0.0686 | -0.1814 | 0.0686 | -0.0564 | 0.0061 | -0.1233 | -0.0252 | 5.9 |
| 205 2 | 0.5426 | 0.3662 | 0.1162 | -0.1338 | -0.0088 | 0.0532 | -0.5201 | 0.0225 | -4.1 |
| 205 3 | 0.6213 | 0.5002 | 0.2502 | 0.0002 | -0.1248 | -0.0623 | -0.6524 | -0.0311 | 20.0 |
| 206 1 | -0.2508 | -0.0508 | 0.1992 | -0.0508 | 0.0942 | 0.0117 | 0.2313 | -0.0196 | 12.8 |
| 206 2 | 0.1813 | -0.1142 | 0.1358 | -0.1142 | 0.0108 | -0.0517 | -0.2017 | -0.0205 | 8.9 |
| 206 3 | -0.4060 | 0.3165 | -0.0565 | 0.1835 | 0.0585 | -0.0040 | 0.4332 | 0.0272 | 14.9 |
| 207 1 | -0.2893 | -0.0300 | 0.2200 | -0.0800 | 0.0950 | 0.0825 | 0.2906 | 0.0013 | 223.5 |
| 207 2 | -0.0591 | 0.1268 | -0.1232 | 0.1266 | 0.0018 | -0.0602 | 0.0296 | -0.0295 | 2.0 |
| 207 3 | 0.8016 | 0.7904 | 0.5404 | 0.2904 | 0.1654 | 0.1029 | -0.7300 | 0.0716 | 11.2 |
| 208 1 | -0.3269 | -0.1255 | 0.1245 | -0.1255 | -0.0005 | 0.0620 | 0.3577 | 0.0308 | 10.6 |
| 208 2 | -0.5892 | -0.4528 | -0.2026 | 0.0472 | -0.0778 | -0.0153 | 0.6052 | 0.0160 | 36.9 |
| 208 3 | -0.5162 | -0.3509 | -0.1009 | 0.1491 | 0.0241 | -0.0884 | 0.5090 | -0.0071 | 72.4 |
| 209 1 | -0.3328 | -0.2315 | 0.0185 | -0.2315 | -0.1065 | -0.0440 | 0.8200 | -0.0128 | 26.1 |
| 209 2 | 0.7883 | 0.6286 | 0.3786 | 0.1286 | 0.0036 | -0.0589 | -0.8160 | -0.0277 | 28.5 |
| 209 3 | -0.3146 | -0.1996 | 0.0504 | -0.1996 | -0.0746 | -0.0121 | 0.3338 | 0.0192 | 16.4 |
| 210 1 | -0.4353 | -0.2432 | 0.0066 | -0.2432 | -0.1182 | -0.0557 | 0.4109 | -0.0244 | 17.8 |
| 210 2 | -0.1066 | 0.1332 | -0.1168 | 0.1332 | 0.0082 | -0.0543 | 0.0836 | -0.0230 | 4.8 |
| 210 3 | 0.2597 | 0.0257 | -0.2246 | 0.0257 | -0.0993 | -0.0366 | -0.2652 | -0.0055 | 46.9 |
| 211 1 | -0.2477 | -0.0226 | 0.2280 | -0.0220 | 0.1030 | 0.0405 | 0.2569 | 0.0093 | 26.7 |
| 211 2 | -0.2277 | -0.2138 | 0.0362 | -0.2138 | -0.0888 | -0.0263 | 0.2827 | 0.0049 | -46.0 |
| 211 3 | 0.6775 | 0.5916 | 0.3446 | 0.0948 | -0.0304 | 0.0321 | -0.6767 | 0.0008 | 820.7 |
| 212 1 | 0.1145 | -0.2323 | 0.0122 | -0.2323 | -0.1073 | -0.0446 | -0.1280 | -0.0138 | 8.4 |
| 212 2 | 0.3209 | 0.2503 | 0.0003 | -0.2497 | -0.1247 | -0.0622 | -0.3518 | -0.0309 | 10.4 |
| 212 3 | 0.2695 | 0.2159 | -0.0341 | 0.2159 | 0.0909 | 0.0284 | -0.2624 | -0.0029 | 90.1 |
| 213 1 | 0.4217 | 0.2221 | -0.0279 | 0.2221 | 0.0971 | 0.0846 | 0.4183 | 0.0034 | 123.8 |
| 213 2 | -0.5357 | -0.3012 | -0.0512 | 0.1988 | 0.0738 | 0.0116 | 0.5167 | -0.0199 | 26.9 |
| 213 3 | -0.2945 | -0.2948 | -0.0248 | 0.2232 | 0.0102 | 0.0557 | 0.3008 | 0.0065 | 48.8 |
| 214 1 | -0.6983 | -0.5029 | -0.2529 | -0.0029 | 0.1221 | 0.0596 | 0.7267 | 0.0288 | 24.6 |
| 214 2 | 07664 | 0.7016 | 0.4516 | 0.2016 | 0.0766 | 0.0141 | -0.7836 | -0.0171 | 44.9 |
| 214 3 | 0.3609 | 0.2281 | -0.0219 | 0.2281 | 0.1031 | 0.0406 | -0.3516 | 0.0098 | 38.9 |
| 215 1 | -0.5990 | -0.3920 | -0.1420 | 0.1080 | -0.0170 | 0.0455 | 0.6132 | 0.0142 | 42.1 |
| 215 2 | -0.6418 | -0.6169 | -0.3669 | -0.1169 | 0.0081 | -0.0544 | 0.6187 | -0.0231 | 27.8 |
| 215 3 | -0.2020 | -0.0166 | 0.2334 | -0.0166 | 0.1084 | 0.0459 | 0.2166 | 0.0146 | 13.8 |
| 216 1 | 0.2267 | -0.0009 | 0.2491 | -0.0009 | 0.1241 | 0.0616 | -0.1964 | 0.0303 | 7.5 |
| 216 2 | -0.7869 | -0.7607 | -0.5107 | -0.2607 | -0.1357 | -0.0732 | 0.9450 | -0.0419 | 18.8 |
| 216 3 | -0.3518 | -0.0994 | 0.1506 | -0.0994 | 0.0256 | -0.0369 | 0.3462 | -0.0057 | 61.9 |
| 217 1 | -0.3168 | -0.0968 | 0.1532 | -0.0968 | 0.0282 | -0.0343 | 0.3138 | -0.0031 | 103.9 |
| 217 2 | 0.3848 | 0.3126 | 0.0626 | -0.1874 | -0.0624 | 0.0001 | -0.4160 | -0.0312 | 12.3 |
| 217 3 | 0.3492 | 0.2517 | 0.0017 | -0.2483 | -0.1233 | -0.0608 | -0.3788 | -0.0296 | 11.8 |
| 218 1 | 0.2194 | 0.0254 | -0.2246 | 0.0254 | -0.0996 | -0.0371 | -0.2253 | -0.0059 | 37.2 |
| 218 2 | -0.6434 | -0.5998 | -0.3498 | -0.0998 | 0.0252 | -0.0373 | 0.6393 | -0.0061 | 106.0 |
| 218 3 | 0.2516 | 0.1355 | -0.1145 | 0.1855 | 0.0105 | -0.0520 | -0.2724 | -0.0207 | 12.1 |
| 219 1 | -0.8197 | -0.5113 | -0.2613 | -0.0113 | 0.1139 | 0.0612 | 0.8396 | 0.0200 | 41.1 |
| 219 2 | -0.1859 | 0.0141 | -0.2359 | 0.0141 | -0.1109 | -0.0484 | 0.1688 | -0.0172 | 10.8 |
| 219 3 | -0.2779 | -0.1231 | 0.1269 | -0.1231 | 0.0019 | -0.0608 | 0.2486 | -0.0294 | 9.5 |
| 220 1 | -0.2296 | -0.0756 | 0.1944 | -0.0956 | 0.0494 | -0.0181 | 0.2477 | 0.0181 | -12.7 |
| 220 2 | -0.2729 | -0.1909 | 0.0991 | -0.1909 | -0.0439 | 0.0186 | 0.2582 | -0.0146 | 18.6 |
| 220 3 | -0.0854 | -0.0404 | 0.2098 | -0.0404 | 0.0848 | 0.0221 | 0.0963 | -0.0091 | 9.4 |
| 221 1 | -0.3921 | -0.2118 | 0.0882 | -0.2118 | -0.0883 | -0.0248 | 0.3990 | 0.0069 | 58.8 |
| 221 2 | 0.8987 | 0.7852 | 0.8852 | 0.2852 | 0.1602 | 0.0423 | -0.8323 | 0.0664 | 13.8 |
| 221 3 | -0.3528 | -0.3370 | 0.0870 | 0.1680 | 0.0880 | -0.0243 | 0.8556 | 0.0068 | 52.0 |

FIG. 13A

RANDOM Q data

| Trial Group | Orig Noise Avg | New Noise Average | | | | | Equiv Voltage Added | Last Noise Avg | Ratio Orig Last |
|---|---|---|---|---|---|---|---|---|---|
| | | 1 | 2 | 3 | 4 | 5 | | | |
| 205 1 | 0.4440 | 0.3970 | 0.1470 | -0.1030 | 0.0220 | -0.0405 | -0.4532 | -0.0092 | 48.1 |
| 205 2 | 0.1928 | 0.0077 | -0.2423 | 0.0077 | -0.1173 | -0.0548 | -0.2163 | -0.0235 | 8.2 |
| 205 3 | 0.2307 | 0.0307 | -0.2198 | 0.0507 | -0.0943 | -0.0318 | -0.2313 | -0.0006 | 392.9 |
| 206 1 | 0.6667 | 0.5649 | 0.3149 | 0.0649 | -0.0601 | 0.0024 | -0.6955 | -0.0288 | 23.1 |
| 206 2 | -0.0969 | 0.1153 | -0.1347 | 0.1158 | -0.0097 | 0.0528 | 0.1174 | 0.0215 | 4.5 |
| 206 3 | 0.0218 | -0.2565 | -0.0065 | 0.2435 | 0.1185 | 0.0560 | 0.0030 | 0.0248 | 0.9 |
| 207 1 | 0.7412 | 0.7194 | 0.4694 | 0.2194 | 0.0944 | 0.0319 | -0.7406 | 0.0006 | 1181.1 |
| 207 2 | -0.2973 | -0.2522 | -0.0022 | 0.2478 | 0.1228 | 0.0603 | 0.3263 | 0.0290 | 10.2 |
| 207 3 | 0.3831 | -0.0517 | 0.1983 | -0.0517 | 0.0733 | 0.0108 | -0.4036 | -0.0205 | 18.7 |
| 208 1 | 0.2199 | 0.1728 | -0.0772 | 0.1728 | 0.0478 | -0.0147 | -0.2033 | 0.0166 | 13.3 |
| 208 2 | 0.4198 | 0.3966 | 0.1466 | -0.1034 | 0.0216 | -0.0409 | -0.4295 | -0.0097 | 43.4 |
| 208 3 | -0.1523 | -0.0900 | 0.1600 | -0.0900 | 0.0350 | -0.0275 | 0.1561 | 0.0038 | 40.1 |
| 209 1 | -0.3033 | -0.2685 | -0.0185 | 0.2315 | 0.1065 | 0.0440 | 0.3161 | 0.0127 | 23.8 |
| 209 2 | -0.0808 | 0.0528 | -0.1972 | 0.0528 | -0.0722 | -0.0097 | 0.1024 | 0.0216 | 3.7 |
| 209 3 | -0.0148 | 0.1385 | -0.1115 | 0.1385 | 0.0135 | -0.0490 | -0.0029 | -0.0177 | 0.8 |
| 210 1 | 0.2507 | 0.1607 | -0.0893 | 0.1607 | 0.0357 | -0.0268 | -0.2462 | 0.0044 | 56.8 |
| 210 2 | 0.2427 | 0.2049 | -0.0451 | 0.2049 | 0.0799 | 0.0174 | -0.2566 | -0.0139 | 17.5 |
| 210 3 | 0.0961 | -0.0761 | 0.1739 | -0.0761 | 0.0489 | -0.0136 | -0.0784 | 0.0177 | 5.4 |
| 211 1 | 0.2869 | 0.2232 | -0.0268 | 0.2232 | 0.0982 | 0.0357 | -0.2325 | 0.0044 | 53.5 |
| 211 2 | 0.4865 | 0.2534 | 0.0034 | -0.2456 | -0.1216 | -0.0591 | -0.5143 | -0.0278 | 17.5 |
| 211 3 | -0.7412 | -0.7089 | -0.4589 | -0.2039 | -0.0789 | -0.0164 | 0.7560 | 0.0148 | 50.1 |
| 212 1 | 0.5285 | 0.3926 | 0.1426 | -0.1074 | 0.0176 | -0.0449 | -0.5421 | -0.0136 | 38.8 |
| 212 2 | 0.1817 | 0.0830 | -0.1679 | 0.0830 | -0.0420 | 0.0205 | -0.1925 | -0.0107 | 16.9 |
| 212 3 | -0.0208 | 0.1420 | -0.1080 | 0.1420 | 0.0170 | -0.0455 | 0.0066 | -0.0142 | 1.5 |
| 213 1 | -0.2570 | -0.1652 | 0.0848 | -0.1652 | -0.0402 | 0.0223 | 0.2480 | -0.0090 | 28.7 |
| 213 2 | -0.0064 | 0.0310 | -0.2190 | 0.0310 | -0.0940 | -0.0315 | 0.0062 | -0.0003 | 24.3 |
| 213 3 | -0.5096 | -0.3200 | -0.0700 | 0.1800 | 0.0550 | -0.0075 | 0.5333 | 0.0237 | 21.5 |
| 214 1 | -0.0246 | 0.1703 | -0.0797 | 0.1703 | 0.0453 | -0.0172 | 0.0387 | 0.0141 | 1.8 |
| 214 2 | -0.1596 | -0.0912 | 0.1586 | -0.0912 | 0.0338 | -0.0287 | 0.1620 | 0.0025 | 62.8 |
| 214 3 | 0.1216 | -0.0494 | 0.2006 | -0.0494 | 0.0756 | 0.0131 | -0.1398 | -0.0181 | 6.7 |
| 215 1 | -0.3403 | -0.0218 | 0.2287 | -0.0213 | 0.1037 | 0.0412 | 0.3502 | 0.0099 | 34.3 |
| 215 2 | -0.1557 | -0.0243 | 0.2257 | -0.0243 | 0.1007 | 0.0382 | 0.1627 | 0.0069 | 22.4 |
| 215 3 | -0.5943 | -0.3037 | -0.0537 | 0.1963 | 0.0713 | 0.0088 | 0.5718 | -0.0225 | 26.5 |
| 216 1 | 0.1581 | 0.0282 | -0.2218 | 0.0282 | -0.0968 | -0.0343 | -0.1614 | -0.0030 | 52.0 |
| 216 2 | 0.3981 | 0.3794 | 0.1294 | -0.1206 | 0.0044 | -0.0581 | -0.4250 | -0.0268 | 14.8 |
| 216 3 | 0.1159 | -0.0841 | 0.1659 | -0.0841 | 0.0409 | -0.0216 | -0.1063 | 0.0097 | 12.0 |
| 217 1 | 0.4497 | 0.2497 | -0.0003 | 0.2497 | 0.1247 | 0.0622 | -0.4188 | 0.0309 | 14.5 |
| 217 2 | 0.5273 | 0.2169 | -0.0331 | 0.2169 | 0.0919 | 0.0294 | -0.5292 | -0.0019 | 278.7 |
| 217 3 | 0.1066 | -0.0700 | 0.1800 | -0.0700 | 0.0550 | -0.0075 | -0.0829 | 0.0238 | 4.5 |
| 218 1 | -0.4485 | -0.2822 | -0.0322 | 0.2178 | 0.0928 | 0.0303 | 0.4475 | -0.0010 | 453.7 |
| 218 2 | 0.0983 | -0.1447 | 0.1058 | -0.1447 | -0.0197 | 0.0428 | -0.0867 | 0.0115 | 8.5 |
| 218 3 | 0.0171 | -0.1190 | 0.1310 | -0.1190 | 0.0060 | -0.0565 | -0.0423 | -0.0252 | 0.7 |
| 219 1 | 0.0508 | -0.1111 | 0.1389 | -0.1111 | 0.0139 | -0.0486 | -0.0681 | -0.0173 | 2.9 |
| 219 2 | 0.2668 | 0.0668 | -0.1882 | 0.0668 | -0.0582 | 0.0043 | -0.2938 | -0.0270 | 9.9 |
| 219 3 | -0.2792 | -0.1891 | 0.0609 | -0.1891 | -0.0641 | -0.0016 | 0.3088 | 0.0296 | 9.4 |
| 220 1 | 0.6507 | 0.6095 | 0.3595 | 0.1095 | -0.0155 | 0.0470 | -0.6349 | 0.0158 | 41.2 |
| 220 2 | 0.6336 | 0.3617 | 0.1112 | -0.1383 | -0.0133 | 0.0492 | -0.6157 | 0.0179 | 35.4 |
| 220 3 | -0.1340 | 0.1748 | -0.0752 | 0.1748 | 0.0498 | -0.0127 | 0.1525 | 0.0185 | 7.2 |
| 221 1 | -0.3141 | -0.1141 | 0.1359 | -0.1141 | 0.0109 | -0.0516 | 0.2938 | -0.0204 | 15.4 |
| 221 2 | -0.0350 | 0.1447 | -0.1056 | 0.1447 | 0.0197 | -0.0428 | 0.0235 | -0.0116 | 3.0 |
| 221 3 | 0.1035 | -0.1367 | 0.1144 | -0.1367 | 0.0117 | 0.0508 | -0.0839 | 0.0196 | 5.3 |

FIG. 13B

Illustration of Comparative Improvement

CIRCUITRY AND METHOD FOR PROCESSING RECEIVE SIGNALS OF A RECEIVE SYSTEM

CROSS REFERENCE TO RELATED APPLICATIONS

This application is a divisional of application Ser. No. 11/145,215 filed Jun. 6, 2005, which is a divisional of application Ser. No. 09/453,526, now U.S. Pat. No. 7,076,227, filed Dec. 3, 1999 under 35 U.S.C. § 111 (a), claiming benefit pursuant to 35 U.S.C. § 119(e)(1) of the filing date of the Provisional Application 60/110,695 filed on Dec. 3, 1998 pursuant to 35 U.S.C. § 111(b); the above noted prior applications are all hereby incorporated by reference.

BACKGROUND OF THE INVENTION

This invention relates to a unique receiver system which enhances the directivity of an incoming beam and improves the Signal-to-Noise ratio of received signals, compared to conventional receiver techniques, and which processes stored received data from an antenna to achieve enhanced directivity and improved Signal-to-Noise characteristics. The invention includes a specific antenna configuration interwoven with a special processing scheme. The invention provides dramatic improvement in the performance of a receiving system and affords greater flexibility with respect to several relevant parameters, such as frequency and antenna size and configuration. The invention is beneficial in various applications that utilize receiving systems. Accordingly, the invention is beneficial in a wide range of commercial and military applications. For example, the noise reduction aspect of the invention is applicable to improving the Signal to Noise ratio (S/N) in wired systems as well as in wireless systems. As such, the invention is applicable to a variety of wireless and wireline telecommunications media applications and other wireless systems, including radar.

In typical radar configurations, a common antenna is used for both transmitting and receiving, and the "transmit" and "receive" beams have essentially the same characteristics. In accordance with the present invention, the transmitter beam would not be narrowed and would distribute its power over a solid angle encompassing either a single, or a multiplicity (cluster), of beams. The equivalent power density per narrowed "receive" beam, in accordance with the invention, is the same as in the original beam, but the effective gain of the narrowed receive beam provides overall enhancement.

It is well established that the characteristics of an antenna used in wireless receiving systems are determined largely by the physical size of the antenna measured in wavelengths of the operating frequency of the system. The horizontal and vertical dimensions (in wavelengths) of the antenna aperture determine the "half power width" of the antenna pattern, or "beamwidth", in each direction. As a consequence, a given available aperture, i.e., "effective antenna" area, dictates the use of shorter wavelengths to obtain proportionately smaller beamwidths and, hence, improvement in directivity of the overall system. Directivity refers to the ability of the receive system to distinguish between signals received from the same general direction. If, for example, the beamwidth of the receive system was narrowed sufficiently, the ability to resolve closely spaced signals would be improved.

The configuration of an antenna can take a variety of geometric forms. For instance, an antenna can be made up of a number of "dipole" radiating elements, each of which receives the signal. A collection of received signals from each element is combined resulting in a final receive signal with a respective overall beamwidth. The beam is then directed, or scanned, in a desired direction to receive signals from, ideally, that particular direction only. As the beam is scanned in other directions, signals from those directions can be distinguished from signals received from the previously scanned directions. However, a problem of interference arises when signals from outside the intended direction of the beam are received and these interference signals cannot be resolved from the signals received from the intended direction. This problem is due mainly to the inability of the given antenna aperture to create a beamwidth narrow enough to distinguish between closely spaced signals.

Further, as each of the individual receive signals is collected from the respective antenna elements, it is typically necessary to amplify the signals to provide sufficient signal strength for subsequent signal processing. Accordingly, in many applications the signal received from each element can be amplified by the use of an associated "preamplifier" having a state-of-the-art "noise figure" to improve the S/N ratio at the beginning, or input, of the system. Under these circumstances, as well as in normal circumstances, this input noise becomes the principal source of noise and establishes the S/N ratio from each element. Enough amplification is typically introduced to provide a signal level appropriate for subsequent processing in the overall system. When the ratio of the signal level as compared to the associated noise level for each receive element is maximized, it becomes easier to distinguish between low-level received signals and the respective noise associated with each received signal. The ability to resolve low-level signals from the noise imparts improved "delectability" and resolution to the overall receive system and is desired in all receive systems.

Therefore, it is desired to raise the S/N ratio as high as possible and at the same time narrow the beamwidth of the antenna in order to distinguish between signals in close proximity from each other and to distinguish signals with low power levels from the noise.

SUMMARY OF THE INVENTION

It is, therefore, an object of the present invention to provide an improved receive system that provides the ability to distinguish between signals existing in close proximity from each other (in elevation and/or azimuth) by providing an antenna with a narrow beamwidth and, simultaneously, providing the ability to distinguish between signals with low power levels from their associated noise by substantially increasing the S/N ratio of the system.

Another object of the present invention is to provide a unique antenna configuration with a given antenna aperture, or size, that provides the same performance as an antenna with a larger aperture.

A further object of the present invention is to provide a unique antenna configuration that can accommodate a wide range of operating frequencies and where the antenna can be either fixed or moveable.

A further object of the present invention is to provide a phase reference for the receiver system to permit formation of I and Q components which are processed separately.

A further object of the present invention is to provide a digital processing method which can be carried out in software.

A further object of the present invention is to provide a receive system whereby received signals are sampled periodically and the noise component of the overall received signal sample is separated from the overall received signal sample leaving a noiseless sample of the received signal.

A further object of the present invention is to provide a method for near-real-time iterative processing which is performed offline with respect to data retrieval using a number of iterative steps.

A further object of the present invention is to provide a "polarity change" sensing means, also referred to herein as a Topographical Change Sensor (TCS), appropriate for executing the several steps of the noise reducing iterative process.

A further object of the present invention is to provide an iterative sequence programmer that provides, in "near real-time," an appropriate control of value steps, and responses to sensed changes that occur in the TCS.

A further object of the present invention is to provide a unique antenna configuration whereby a number (i.e., 2 or more) groups of signals are formed, each at different phase multiples of each other enhancing the ability to separate, i.e., resolve, signals with different arrival angles.

A further object of the present invention is to provide noise reduced I and Q signals, the angle of which is the arctangent of Q divided by I for each of 2 or more groups that have the same phase multiples.

A further object of the present invention is a description of a phase gate analogy as a means of defining the realization of the resolution function and its criteria.

A still further object of the present invention is to provide a series of simultaneous phase multiplications of the arctangent of Q divided by I to form a sharpened receive beam.

A still further object of the present invention is to provide for the sharpened beams (from the "effectively larger aperture") to be electronically steered in angular directions by the introduction of appropriate phase shifts applied within the system.

An even further object of the present invention is to provide a "cluster" or "pincushion" of sharpened beams formed from an array of real elements. The cluster being contained within the normal unenhanced beam and facilitating coverage of an angular sector as an alternative to searching with a single sharp beam.

To achieve the above and other objects of the present invention the following embodiments are provided as examples of the invention. Persons skilled in the art would be aware of techniques available to modify various elements of the invention without straying from the scope and spirit of the invention.

In accordance with the above objects, one embodiment of the present invention provides an array antenna comprising a modest number of radiating/receiving elements (about 20-30). Each element receives a respective portion of an overall receive signal. The individual received signals are amplified and presented to Analog-to-Digital (A/D) converters where digital representations of In-phase (I) and a Quadrature (Q) components of the received signals are determined. Incidentally, it is in this amplification stage that most of the noise which comprises the overall system noise is inherently introduced, as in any receive system. A phase reference is established which is necessary for subsequent processing and the I component, also known as the I-vector, is set to this phase reference while the Q component, or Q-vector, is established 90 degrees out of phase with respect to the reference.

A clock reference for the A/D conversion is synchronized with the phase reference. Each of the I and Q components, thus, contains both signal and noise and may include other unwanted signals as well, in the form of interference, as discussed above. Some signals that interfere with the desired signals are those that emanate from a direction within an "unenhanced" or real beam (and outside the angular coverage of the enhanced, or sharpened, beam). A discrimination process is provided in accordance with the invention by using several groups (3 in one embodiment) of signals from separate elements as part of a phase multiplying process. The desired discriminating affect results from the phase multiplying process because the groups are displaced from each other in distance and, therefore, phase.

Further, a multi-step process is performed on the collected data wherein a matrix for each of the I data, as well as the Q data, samples is initially created which includes several samples of signal-plus-noise data. The data is formatted and applied to an iterative process scheme consisting of an "iterative sequence programmer" and a special topographical number array that serves as a polarity "change sensor". Upon completion of the iterative process, "noise-only" data results which is the net algebraic sum of the different iterative values. The noise-only data is subtracted from the signal-plus-noise samples leaving only the signal, without noise.

The invention provides an improvement to the entropy of a sequence of events that have previously occurred and have been stored.

BRIEF DESCRIPTION OF THE DRAWINGS

The objects and features of the present invention will become more readily apparent from the following detailed description of the preferred embodiments taken in conjunction with the accompanying drawings in which:

FIG. 2(*b*) is a representation of signal amplitude (volts) versus angle, θ, according to the array shown in FIG. 2(*a*).

FIGS. 8(*b*) and 8(*c*) are graphical representations of the results of a phase gate technique in accordance with the present invention.

FIGS. 9(*b*) and 9(*c*) are plots illustrating the probability density for the phase of signal-plus-noise at various signal-to-noise ratios.

FIG. 10(*b*) is a chart illustrating example voltage values and related average and sum values for data received from an array as shown in FIG. 10(*a*).

FIGS. 12(a) through 12(d) are computer simulation printouts illustrating left (13(a) and 13(c)) and right (13(b) and 13(d))topological groupings in accordance with the present invention.

FIG. 12(e) is a combined computer printout containing data from FIG. 12(c) on the left side and FIG. 12(d) on the right side to illustrate "column shifting affects" in accordance with the present invention.

FIGS. 13(a) and 13(b) are computer simulation printouts for I and Q data, respectively, illustrating the results of the iterative processing scheme in accordance with the present invention.

DETAILED DESCRIPTION OF THE PREFERRED EMBODIMENTS

Figure 1:
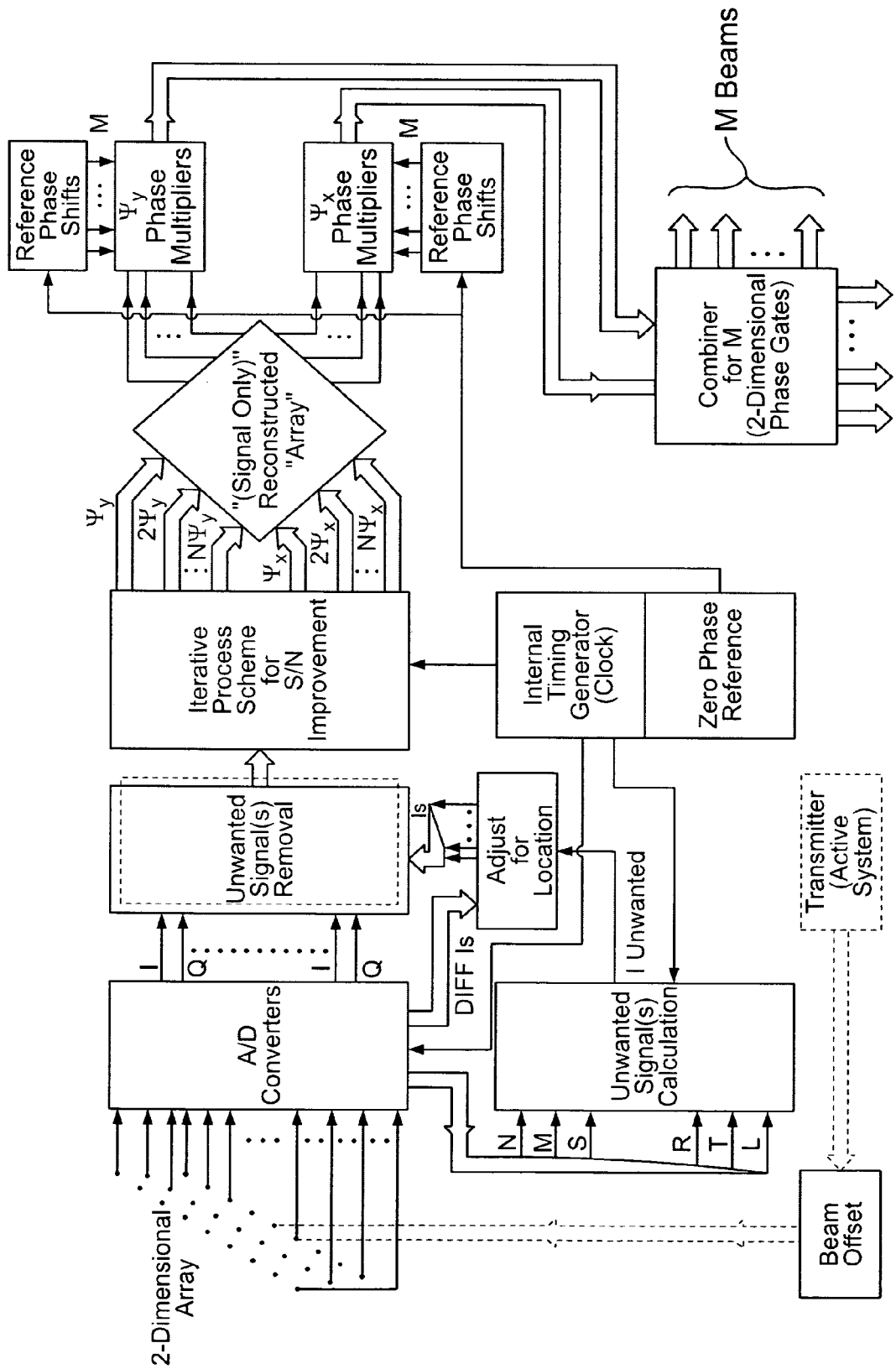
FIG. 1 is a block diagram illustrating an overall system configuration of the system in accordance with a preferred embodiment of the present invention.

Nature of the Software Processing and Performance Impact

There are several aspects of the present invention specifically directed to improving the signal-to-noise ratio of a received signal beyond what would be predicted by classical information theory. These aspects are important to distinguish. Foremost of these aspects is the "offline" processing of stored information. Storage occurs as analog-to-digital conversion is performed resulting in a series of digital representations of the received data.

Subsequent processing is achieved using modern integrated circuits in an "offline" way that does not adversely affect the bandwidth of the system. Offline processing requires a tolerable transport time delay. As a consequence of the delay, however, "near real-time" performance results. It is this aspect that presents fundamental opportunities over what can be accomplished in conventional real-time processing. Departure from real-time (analog systems) accounts for a potential to obtain signal-to-noise improvement substantially beyond that achieved by merely averaging noise samples (and applying the average to a matched filter). If one were to attempt to attribute the improvement over simple summing, it would lie in the improvement of the entropy of the overall process. The present invention has brought a degree or "order" not previously present.

The order achieved by the present invention is the result of iteratively forcing each and every sample of the noise to change polarity in a carefully defined manner. This iterative process is performed on successive trials.

The above aspect of the invention has a tremendous impact on performance and therefore is one of the primary aspects of the present invention. The ability to reduce "thermal noise" affects, inherent in any receiving system, to a level below that which can be achieved by the averaging of several trials is unique. This achievement is made possible by the "digital" nature of the process; however, the "digital" nature itself does not produce the achievement. Rather, it is the subsequent use of the digital data in the software, especially in the iterative process, that accomplishes the goal.

The invention, basically, consists of an improvement to the entropy of a sequence of events that have previously occurred and have been stored.

Unique Response to External "Noise"(or Interferences)

It is important to clarify how this invention differs from a multitude of approaches that discriminate against external interference often referred to as "noise". Such external noise is, of course, different than the thermal noise that has inherently limited the achievable performance of receiver systems and which is the basis of the dramatic improvement provided (and required) by this invention.

Externally generated "noise" (interference) is best reduced by improving the directivity of the antenna and enhancing its ability to discriminate among sources. When there is a multitude of sources (as in, for example, cellular communications), the many sources can be treated statistically as "external noise"; present state-of-the-art techniques attempt to extract a specific signal from such "random" background interference (or "noise").

It is appropriate to point out that while the processing of the present invention does not specifically address this type of situation in detail, it copes with such interference as part of its innate ability to act like a larger equivalent antenna (thereby having a much greater directivity or beam sharpness). This discrimination cannot be achieved unless the thermal noise had been reduced to near zero. Under these circumstances, the invention employs a phase multiplying technique to obtain a very high degree of resolution. This is performed by multiplication of a very accurately derived (noise free) angle of arrival, specifically calculated as the arctangent of Q/I.

Figure 14:
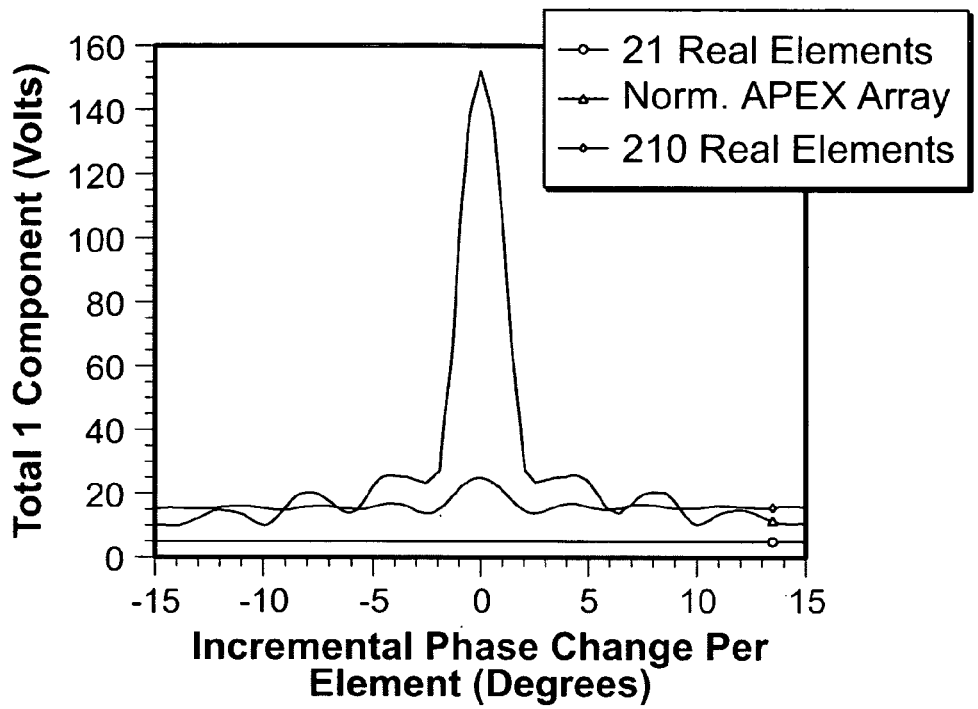
FIGS. 14(a) and 14(b) are graphical representations illustrating an example of the improvement in Signal-to-Noise and beam shaping resulting from the present invention.
Figure 14:
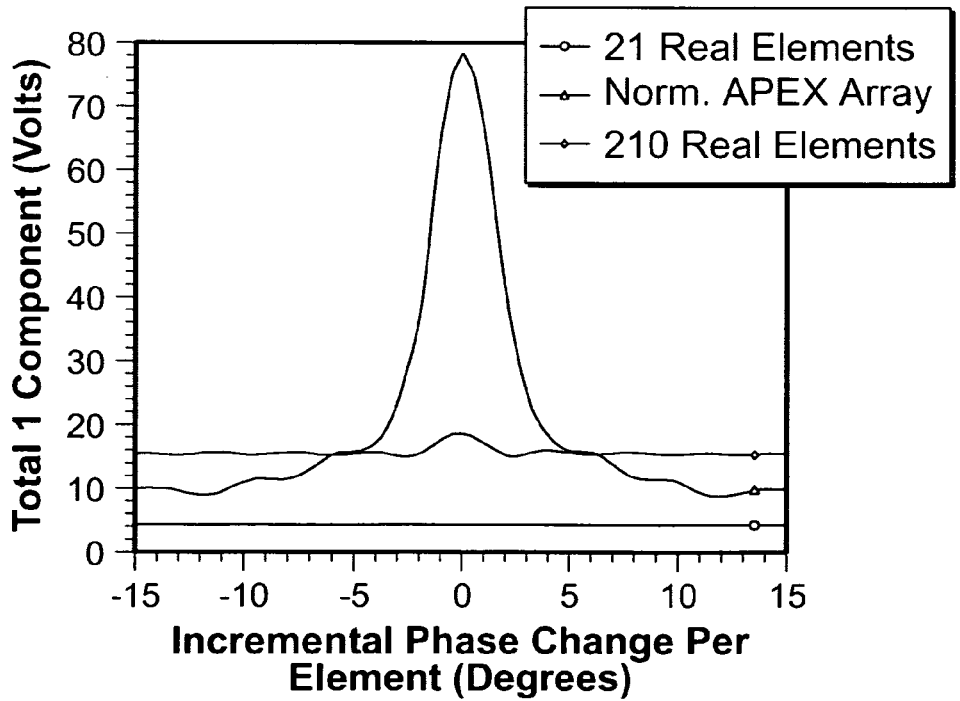

The above angle is measured using 2 or 3 groups derived from different subparts of the array. (See FIG. 14 for the shape of its response.) Thus, the performance of the present invention minimizes the need for present state-of-the-art techniques for antenna interference reduction.

System Implementation

FIG. 1 illustrates examples of primary elements of the invention and their attendant functions, including: (1) a two-dimensional array, (2) S/N enhancement achieved by two interlocking processes and (3) beam width narrowing, performed in a manner to minimize "unwanted signal" interference.

The benefits of the present invention are best realized when all of the contributing elements of the invention are combined in a single overall system. However, the present invention and its benefits may also be realized upon separating independent elements and utilizing the separated elements independently to obtain desired results.

In accordance with an embodiment of the invention, a multi-element array is illustrated as part of FIG. 1. While this is a typical configuration in accordance with an embodiment of the present invention, it is not intended to limit the number of elements in each row or each column. Antenna elements are grouped in a manner to accommodate the interlocking processes of noise reduction and phase multiplication. The antenna array configuration is necessary to make the two mentioned processes viable; the noise reduction, in turn, further depends upon an iterative, multi-step process which is an essential part of the noise reduction process. The unwanted noise is reduced in several steps by a process that can detect whether the noise polarity resulting from each iteration changes.

Figures 10A, 10B:
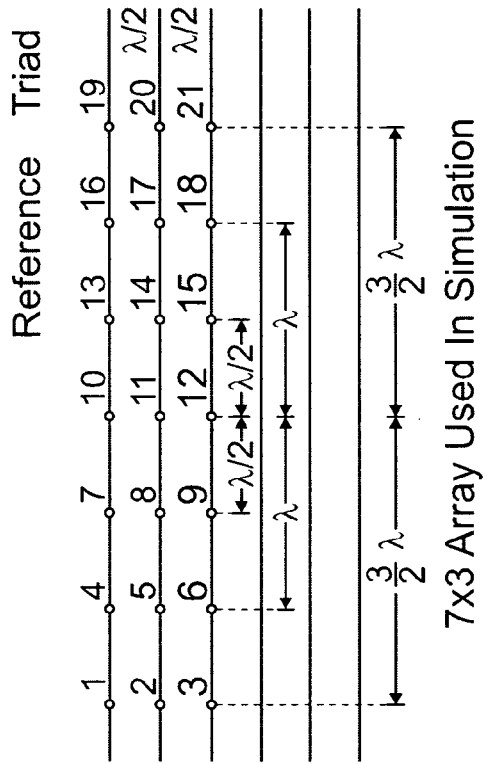
FIG. 10(*a*) illustrates a typical array configuration in accordance with the present invention.

As the number of total antenna elements is increased, a wider variety of configurations becomes possible. For example, the antenna element configuration shown in FIG. 10(a) utilizes seven groups of three elements each contributing to the reduction of noise in each group to achieve I and Q signals suitable for the subsequent phase multiplying operation. According to one embodiment of the invention, each group receives six signal-plus-noise samples, three from a 'left' group and three from a 'right' group. For each of the right and left groups, the signals are predictable in relative magnitude as determined by trigonometry, while the noise samples are totally decorrelated. The spacings, in azimuth, between the left and right groups of elements are multiples of a half wavelength ($\lambda$2) with respect to the center of the reference group (of three vertical and seven horizontal elements). This spacing provides azimuth discrimination enhanced by the phase multiplying operation which can be performed mathematically by subsequent digital processing.

The individual antenna elements are designed to be as broad-banded as feasible. Because there are relatively few elements of half-wavelength spacing (as compared to a large multi-element array), the frequency sensitivity of the total array can be designed to function properly over a reasonably wide frequency range.

The signal from each "receive" element is amplified by an appropriate amplifier (not shown). Accordingly, the overall noise of the system is introduced primarily at the front-end of the receiving system. The amplification process may include a low noise amplifier in many applications. After amplification, the signal from each element is converted to a digital value in the form of I (in-phase) and Q (quadrature) components. If several signals are simultaneously present, for example at different elements of the antenna, the overall I and Q values will be the vector composite of the several signals present. These overall values will change from time to time, i.e., from sample to sample from the A/D converter. The observation time for each set of signals is determined by the desired reception characteristics (such as information rate and other characteristics of the desired receive signal).

The frequency of the signal received at each antenna element can be "heterodyned" to permit the key operations to be performed at a lower (intermediate) frequency. The reference signal, or local oscillator (LO), is referenced to the carrier by deriving the LO signal from a common frequency reference. The lower frequency limit of the heterodyned signal is determined by the bandwidth needed.

The signal from each element is amplified to provide a convenient working amplitude at an acceptable signal-plus-noise level for the subsequent processing. Accordingly, several branch signals can be obtained, each having the same S/N ratio as the original signal. Any noise introduced after this point, by subsequent circuitry, is negligible compared to the amplified signal-plus-noise. This is unlike the effect of dividing the signal directly from the elements into N channels before amplification. Since almost all of the noise is introduced at the input to the receiver, dividing the signal before this point would divide the overall signal power by N.

The I and Q outputs from each of the associated elements are used for different purposes to achieve the overall aspects of the invention. Each element can perform its necessary function independently without affecting the digital outputs of other elements.

When certain signals, such as interference, are present they appear in somewhat predictable ways at all of the elements.

The different computing functions shown in each of the several blocks can be processed simultaneously, and parallel processing is an option. The results are applied to effect the following sequence of tasks:

(A) S/N enhancement
1. Preparing a signal (plus noise) format from the antenna outputs.
2. Applying an iterative sequence of several controlled steps that results in the overall convergence (in steps) of the noise average toward zero.

(B) Resolution improvement
Software step 2 is performed as off-line processing while step 3 is performed using the result of step 2.

Enhanced signals from the many combinations of elements are arranged in a way that corresponds to the original array. This involves combining groups having like-signal phase multiples, e.g., group 1, group 2, etc. Phase multiplication and a subsequent summing operation are then performed with each group to achieve the desired higher resolution (and S/N ratio).

The resolution improvement portion of the present invention will be discussed first since, conceptually, narrowing the beam of the receive system occurs prior to, or simultaneously with, receiving the desired signals. However, the sequence of operations can be changed in order to accommodate different processing techniques which lead to similar results. Subsequently, the processing portion of the invention which leads to S/N reduction will be discussed.

Resolution Considerations

Figure 2A:
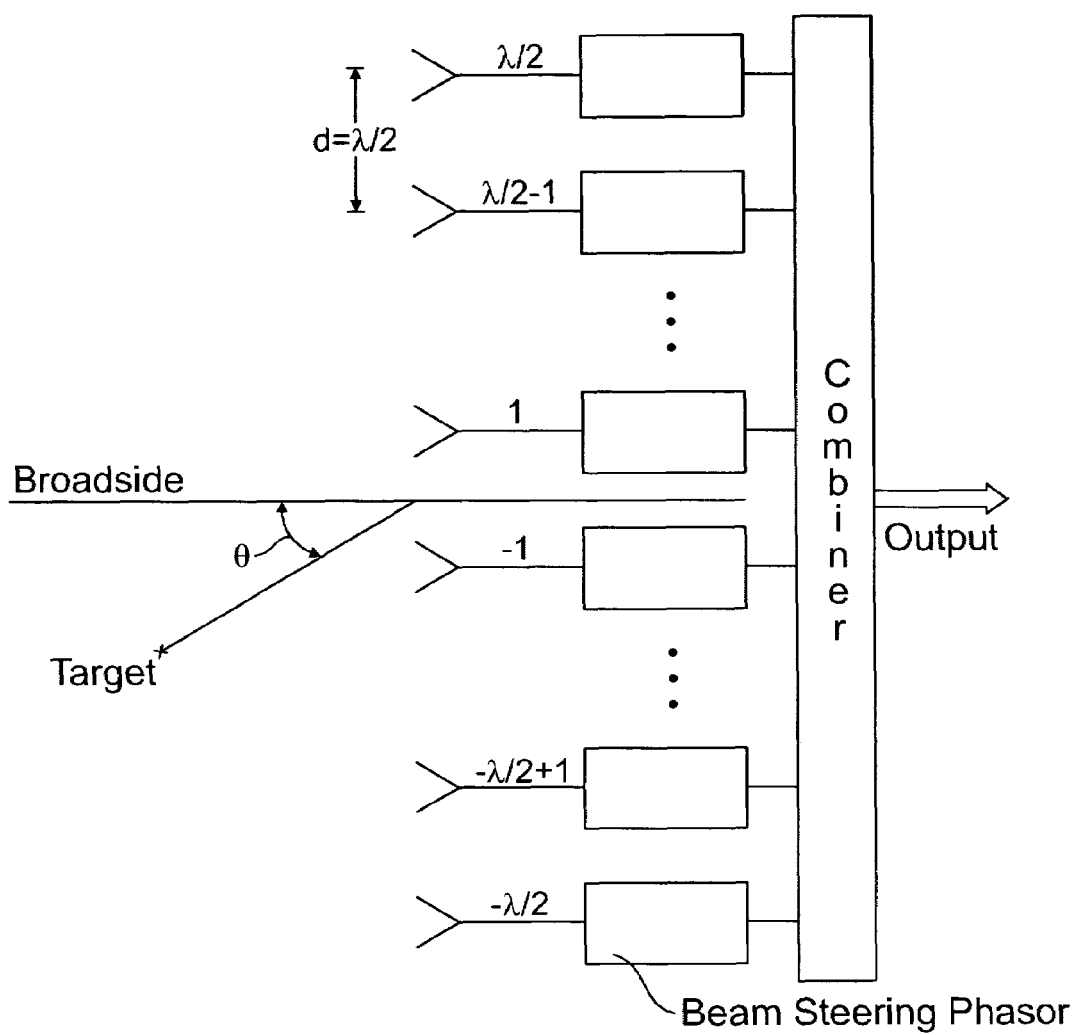
FIG. 2(*a*) is a block diagram illustrating a portion of an antenna array in accordance with an embodiment of the present invention.
Figure 2B:
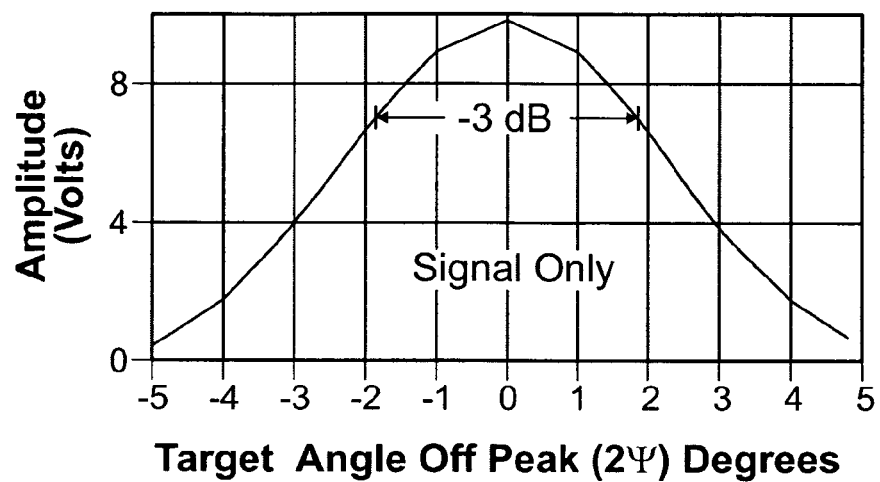
Figure 3A:
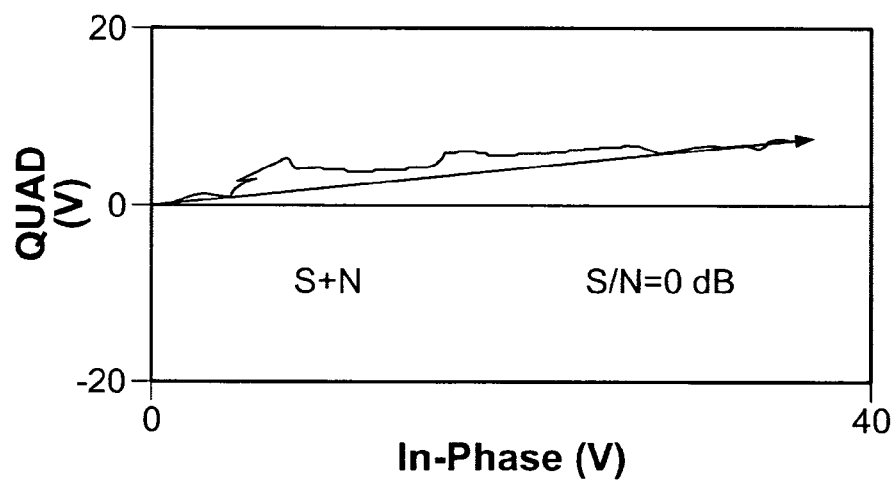
FIGS. 3(*a*)-3(*c*) are chart plot illustrations of the I vs. Q vectors for a collection of receive elements for S/N ratios of 0, 10 and 20 dB, respectively.
Figure 3B:
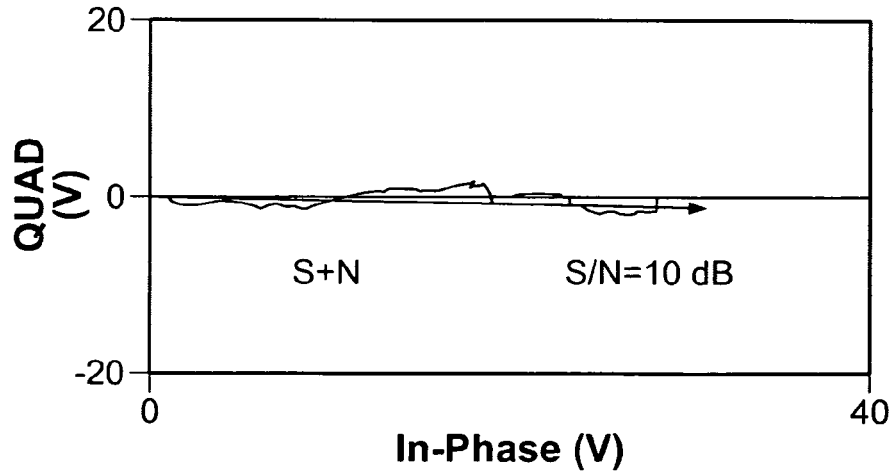
Figure 3C:
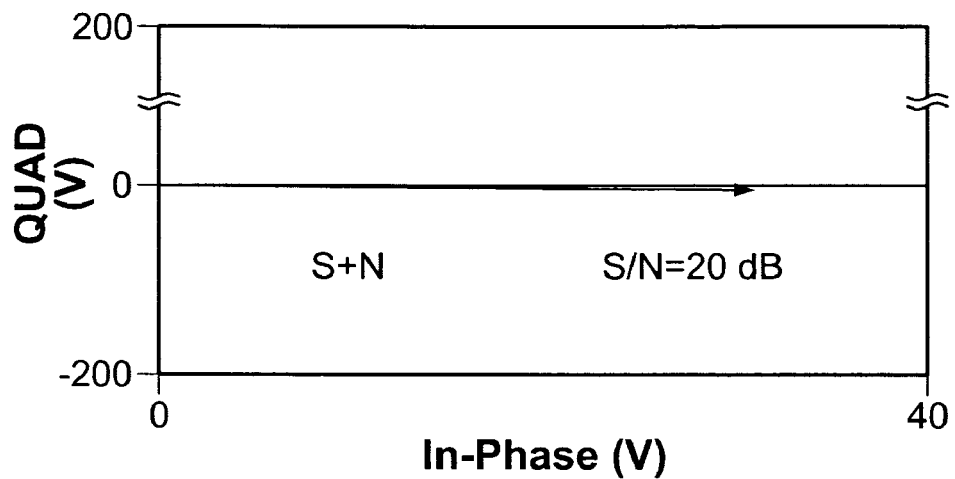
Figures 1, 9A:
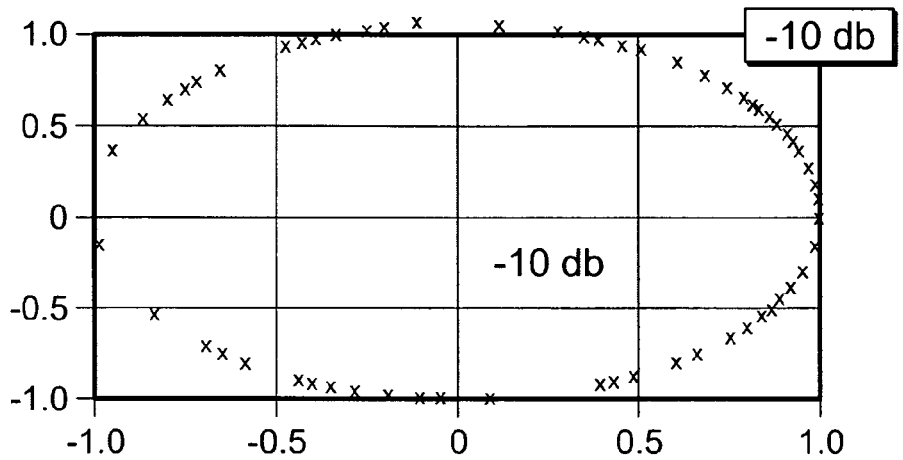
Figures 2, 9A:
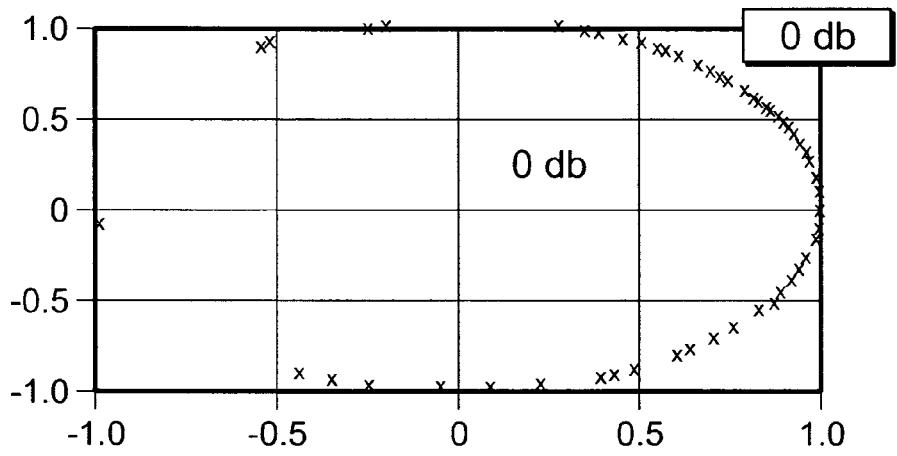
Figures 3, 9A:
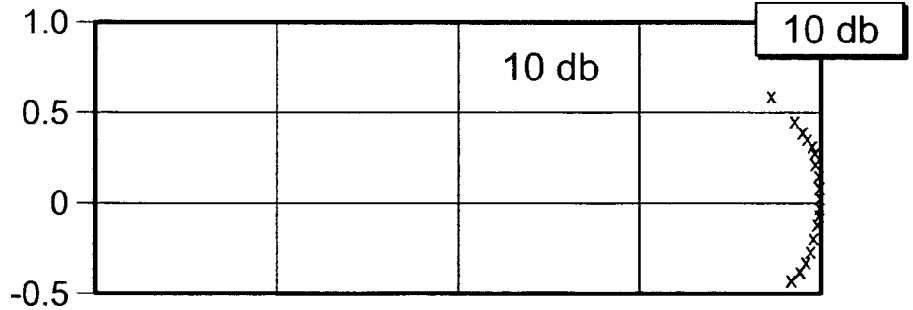
Figures 4, 9A:
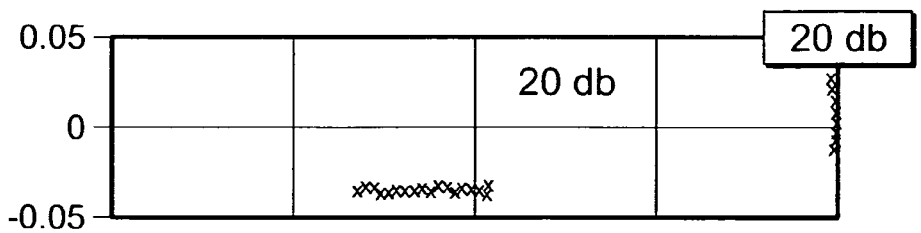

FIG. 2(a) illustrates a basic array of like elements in one dimension. A generic array yields an amplitude versus angle $\theta$(referenced from the broadside) response as shown in FIG. 2 (b). The composite vector resultant of all vectors from all of the elements produces the response shown in FIGS. 3(a)-3(c) for three different signal-to-noise levels, namely 0 db and 10 db and 20 db, respectively. At the 20 db level, FIG. 3(c), there is almost no Q component. However, the Q contribution grows as the signal is reduced, as shown in FIG. 3(a).

Figure 4A:
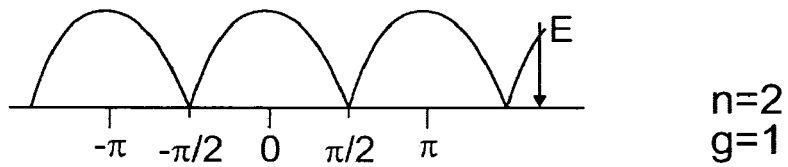
FIGS. 4(*a*) and 4(*b*) are graphical representations of two different array factors to help explain the present invention.

In an antenna array configured accordingly, vector addition of elements creates an overall pattern by modifying the composite pattern of each element by a factor called the "array factor." For a simplified two-element case, the array factor would take the form shown in FIG. 4(a).

Figure 4B:
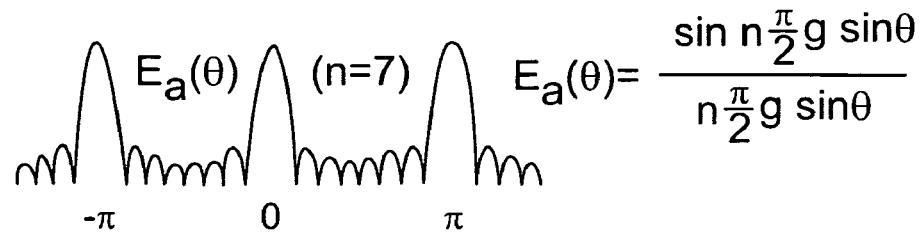

If, however, instead of two elements there are N elements, each spaced a fixed distance apart, the array factor takes the form shown in FIG. 4(b), in which N=7. Thus, for the multi-element case, the array factor shape approximates the function (Sin nx)/nx.

A key aspect of the invention is the establishment of a phase reference, as discussed previously, such that the desired output signal will occur "in-phase" with the reference. There are two important factors that cause the desired signal to be displaced from zero phase (Q=0). One is the phase, $\beta$, of signals intercepted, or arriving, at each element with respect to the phase reference. Phase, β, can assume any value between 0 and 2π radians. Since β is the same for signals intercepted at all elements at a given time, it can be canceled when the comparison is made between pairs of elements. This beta cancellation takes place automatically, early in the overall process, i.e., when the signals are combined, and after each signal has been converted to I and Q digital components.

Resolution Improvement by Phase Multiplication

The beam narrowing aspect of the present invention approximates the array factor shown in FIG. 4(b) by using several different phase multipliers, making the Nth signal appear as if it came from a radiator +NS distance away from the center of the array of elements. In this process, there are additional signals constructed to correspond to those that would be received from radiators separated by a distance 2, 3, 4 . . . N times S/2, i.e., times half wavelengths of the phase, β. These additional signals are required to place more of the signal energy into the "main beam" to better approximate the array factor of FIG. 4(b).

To accomplish the above objective, the phase shift φ(phi) is obtained from two or more elements and "magnified" by 1, 2, 3 . . . N different multipliers as shown in FIG. 1. Alternatively, N radiators, equally spaced between 0 and half a maximum distance, Smax/2, can be used to provide different phase shifts, $\phi_1 \phi_2, \ldots \phi_n$. Such different phases would be magnified by different multipliers, $N_1, N_2, N_3$.

Figure 5:
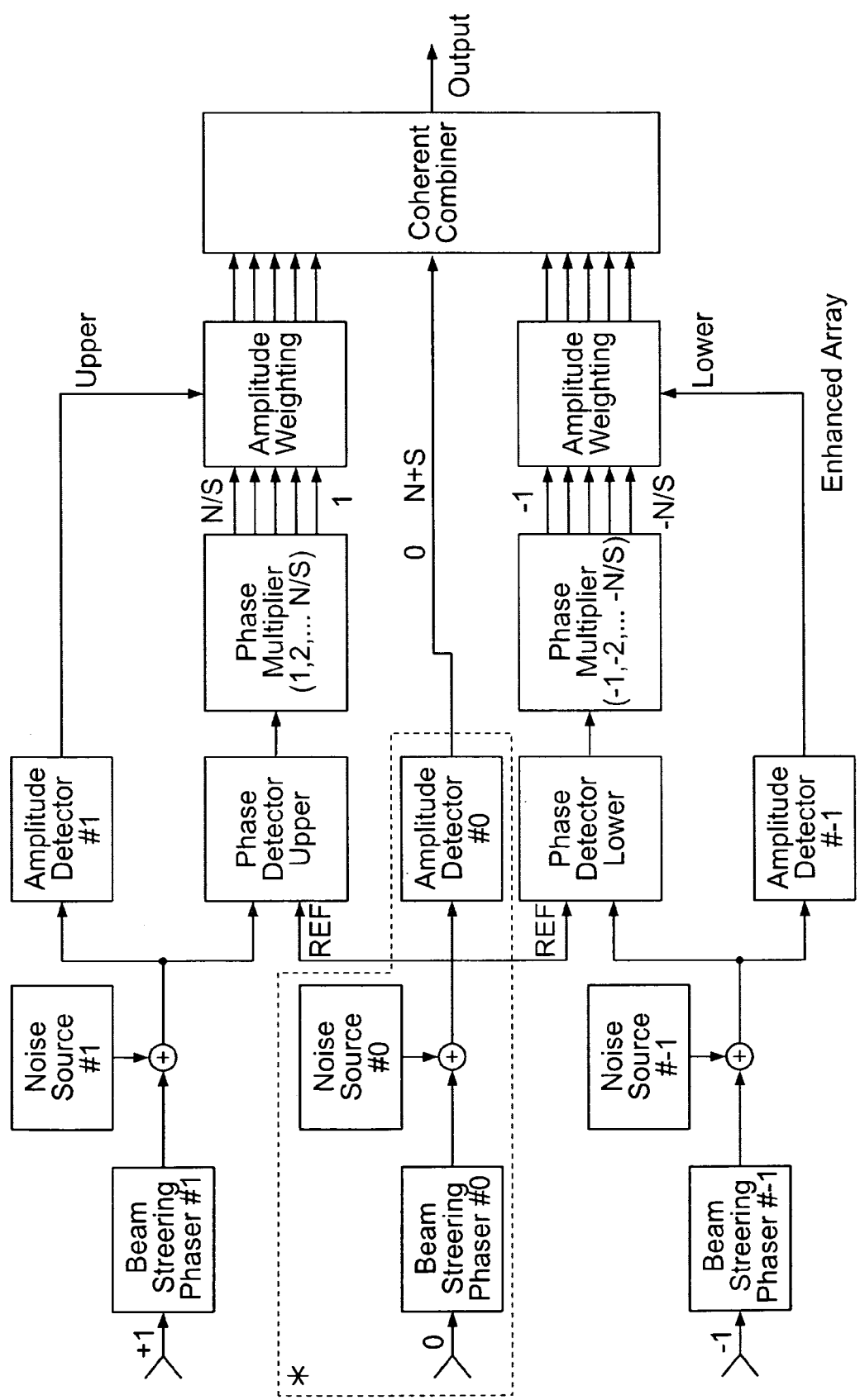
FIG. 5 is a block diagram illustrating the process flow of a phase multiplying aspect in accordance with the present invention.

Actual radiators are placed a half-wavelength, λ2, apart (or multiples thereof) to prevent dividing the signal power among the different radiators. The basic operation, shown in FIG. 5, can be summarized as follows: A signal $s_1$, is captured at antenna element 1. Signal, $s_1$, is initially phase rotated through an angle less μ and then a key operation is performed: a phase angle φ is subtracted, corresponding to the phase of a signal from a physical angle θ from the normal to the array plane. The phase difference, E, between the actual signal $s_1$ and that of the theoretical one emanating from precisely the desired pointing angle θ is then repeatedly phase multiplied by integers ranging from 1 to N. Each one of these products corresponds to the output of a corresponding antenna element. By summing these outputs coherently, the angular sensitivity of the array can be increased by a factor of N.

Figure 7A:
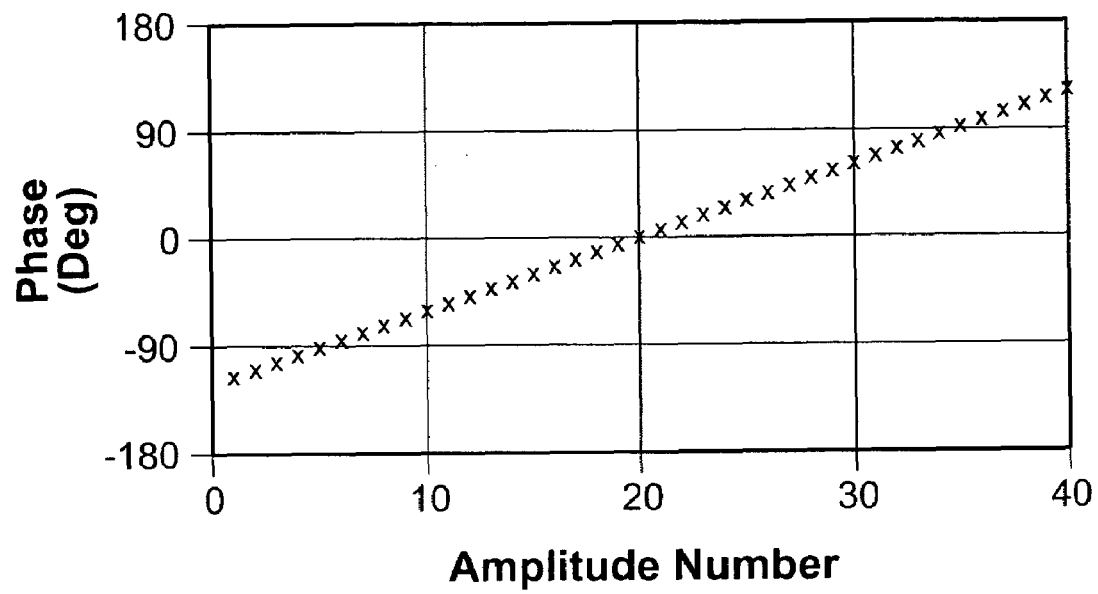
FIGS. 7(*a*)-7(*b*) are graphical representations of phase and amplitude versus the number of array elements in accordance with the present invention.
Figure 7B:
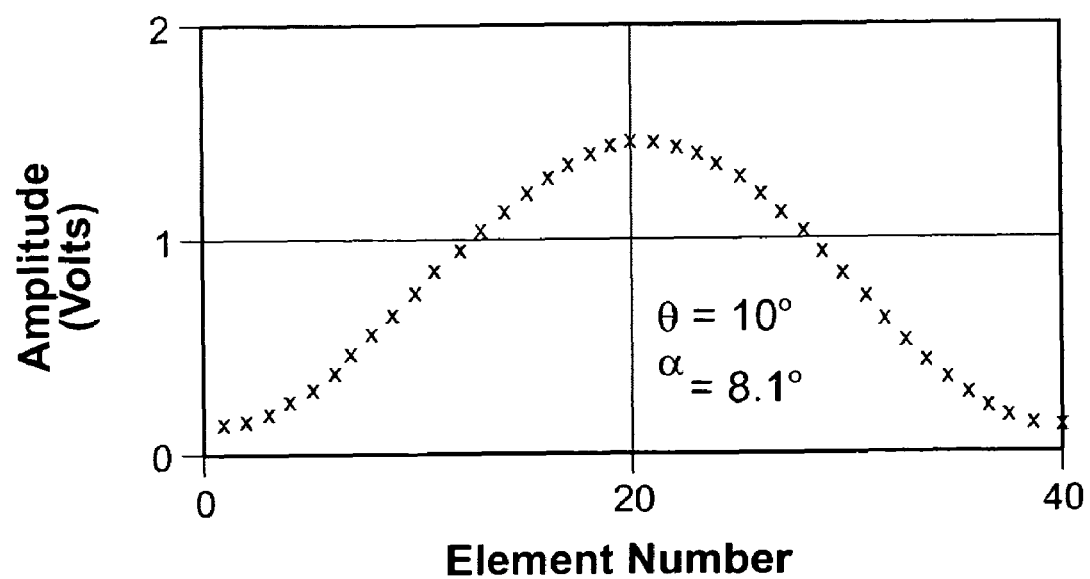

The resulting amplitude and phase characteristics resulting from the phase multiplication techniques just described are shown as FIG. 7.

Figure 6A:
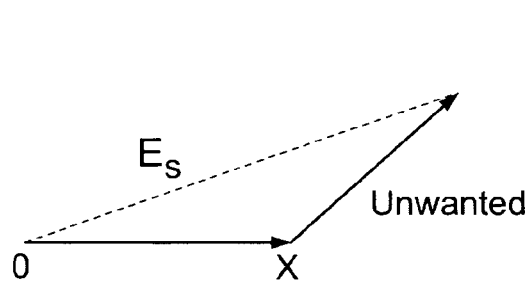
FIGS. 6(*a*)-6(*d*) are vector diagrams illustrating various vector combination techniques in accordance with the present invention.
Figure 6B:
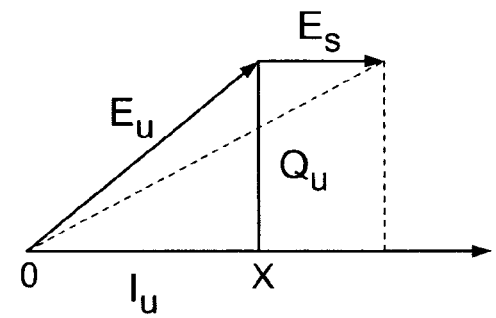

To aid in understanding the affects of noise, a fundamental addition to the process just described is provided. This addition is best understood by reference to FIG. 6(a) which shows the vector sum of the desired signal, $E_s$, and an unwanted second vector, $E_{unwanted}$. The desired signal is shown as an in-phase (or horizontal) vector while the undesired signal is represented by a vector, of arbitrary angle, joined at point X in FIG. 6(a). Such a vector diagram is representative of the output of each element of the array after amplification of the received signal. Also, both the phase and magnitude of the unwanted vector are "unknown" (Note that the same vector result occurs when the vectors are interchanged as shown in FIG. 6(b)).

Figure 6C:
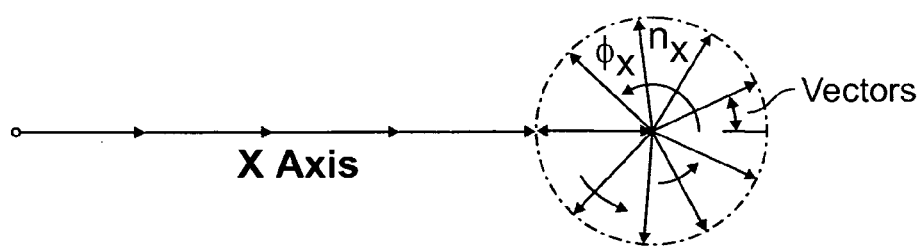

The key to achieving the desired performance of a receiving system according to the present invention is to execute the phase multiplication process about the vector junction point X rather than the origin (point 0). When multiplication takes place about X, the desired signal vectors all align end-to-end while the undesired ones "spin" around, as shown in FIG. 6(c).

Figure 6D:
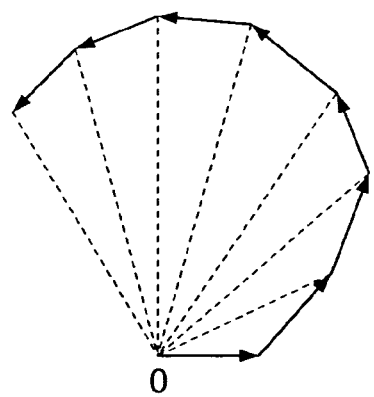

If the rotation takes place about the origin, 0, the result is as shown in FIG. 6(d). Here, the composite vector E is formed by the addition of the vectors at end-to-end multiple phase angles so as to form the "clam shell" type of diagram illustrated by FIG. 6(d). A consequence is that the X components of the signal do not all add in phase and when the number of multiples of N is large, the signal component is substantially reduced relative to the noise.

Phase Gate Analog

Figure 8A:
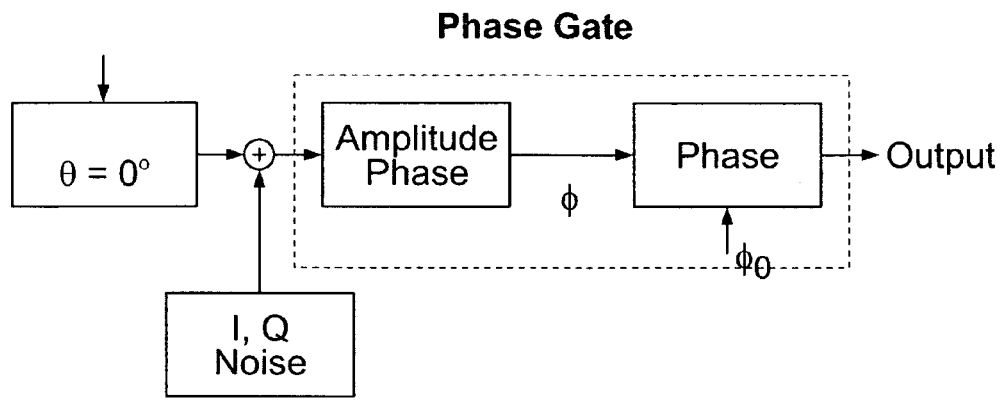
FIG. 8(*a*) is a block diagram illustrating a phase gate technique in accordance with the present invention.
Figure 8B:
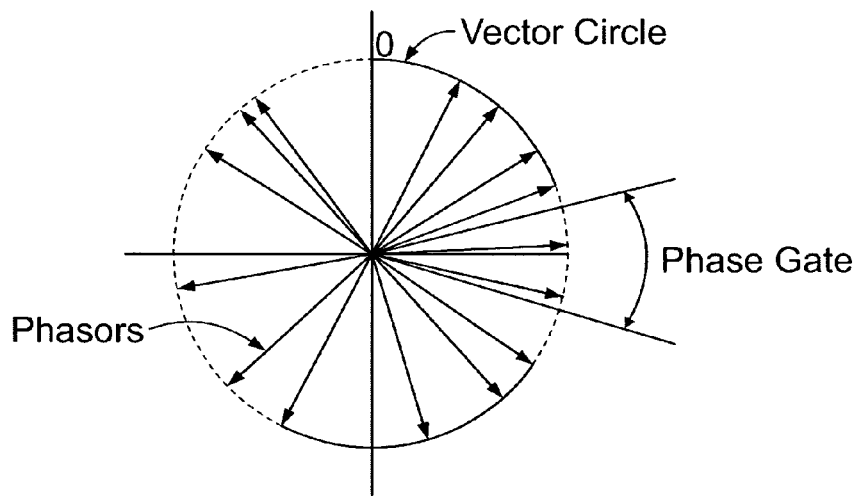
Figure 8C:
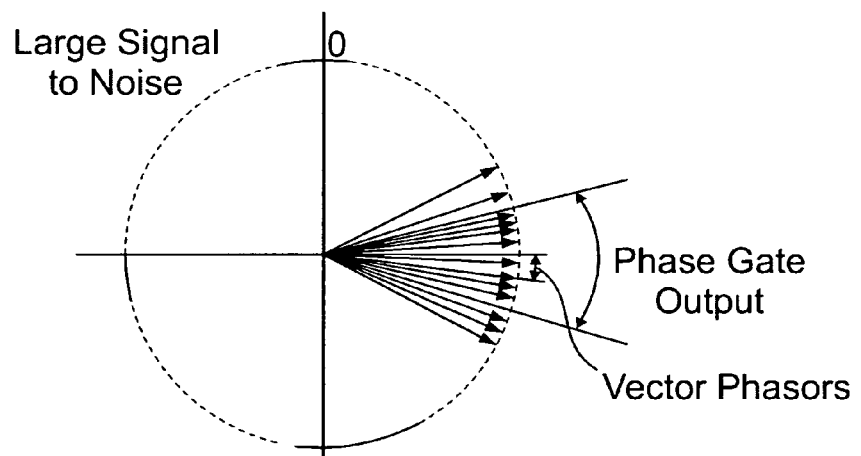

Conceptually, the phase-multiplication process can be regarded as a means of forming a phase "bin" or "gate". Such a concept helps in understanding the formation of multiple beams as explained later and the configuration is represented by simulation, as shown in FIGS. 8(a)-8(c).

If a phase angle, $\phi_A$, is chosen to correspond to the axis crossing of a signal to be detected, the center of the phase gate corresponds to $\phi_A$. The phase gate is used to discriminate between signals whose φ is other than $\phi_A$ plus or minus a small Δφ width. When $\phi=\phi_A$ the desired conditions are obtained. Ideally, maximum signal output occurs due to signal vector alignment (along the horizontal axis) at all values of n as illustrated by FIG. 6(c).

Signals at all values of φ other than $\phi_A$ are attenuated, because they are displaced by angle θ and, hence, phase φ and therefore fall outside of the phase gate width. The amount of attenuation is determined by the skirt response of the "gate-"which is related to the beam shape.

The "sharpness" of the amplitude peak as shown, for example in FIG. 7, increases as n increases. When 1 through N simulated elements are summed, the composite result is shown, for example, by FIG. 15(a). When two-dimensional enhancement is involved, these can be N2 vectors at a specific phase $\phi_x$ and $\phi_y$, combination FIG. 15(b)). This serves to sharpen the amplitude characteristic further. The "half-power" width of the phase gate determines the "half-power" width of the narrowed beam(s) that are formed. Additional phase gates could be spaced in-between successive phase gates, thereby placing intermediate sharp beams in the total antenna pattern FIG. 15(c)).

The entire phase gating process can be carried out in parallel by splitting the input signals into n channels and running n phase gates in parallel. By adding additional phase gates and splitting the signals to feed them, all possible beam positions can be observed simultaneously, if desired. Such an arrangement constitutes a "pin cushion" of beams.

The successful use of the above process is dependent upon the reduction of noise and other interference so that the phase multiplying process takes place about the origin, 0, as discussed previously. This requires a negligible displacement due to either interference or noise. This will become more evident after a demonstration of how noise affects the process.

Simulated Performance of Phase Gate in Presence of Noise

The basic premise for a phase gate is that the phase of signal-plus-noise depends on the signal more than on the noise, since over multiple samples, noise phase is random from sample to sample, while signal phase is constant. Thus, if the phase of the signal-plus-noise is measured and compared to the expected signal phase, samples can be separated into those that are close to expected and those that are not.

The basic phase gate concept is illustrated in FIG. 8. The phase of noise-corrupted samples is measured and compared to a phase threshold. If the measured value falls within plus and minus half the selected phase gate threshold window value, the sample is passed on to the output, otherwise the sample is dropped. This approach corresponds to a rectangular gate which is an idealized form for analysis.

The signal phase is assumed to correspond to the system reference phase so the phase gate can be symmetrically set about this value. The signal phase would be a priori set to correspond to some value of φ; many values of φ could be accommodated by a "bank" of contiguous phase gates, each of which accepts a different phase value, so any signal phase will line up in one channel.

A simulation was performed which generated Gaussian noise and embedded a signal with known S/N and phase. FIGS. 8(b) and 8(c) illustrate the S+N phase vectors, in general, for noise-only and for large signal-plus-noise (S+N), respectively. In the noise-only case (FIG. 8(b)), the phases are uniformly distributed over 360 degrees, so a phase gate of, about 10 degrees, would pass, on the average, 1/36 of the applied samples. With a signal present (FIG. 8(c)), the phases become non-uniform, and "bunch-up" around the signal phase value. Thus, in the presence of a signal many more samples are passed through to the output, for the same 10° phase gate.

For the simulation, a computer was set up to generate phasor diagrams similar to those shown in FIG. 8(c). FIG. 9(a) shows such diagrams for values of S/N of −10, 0, 10 and 20 db; (the diagrams would be circular if the two scales were the same). Each "x" designates the location of the vector tip. Each diagram represents 100 random samples of S+N. Thus, 100 "x's" are provided in each of the plots of FIG. 9(a). However, due to overlap of some of the "x's", all 100 are not visible in every plot. For positive S/N values, the phase bunching becomes quite pronounced.

Figure 9B:
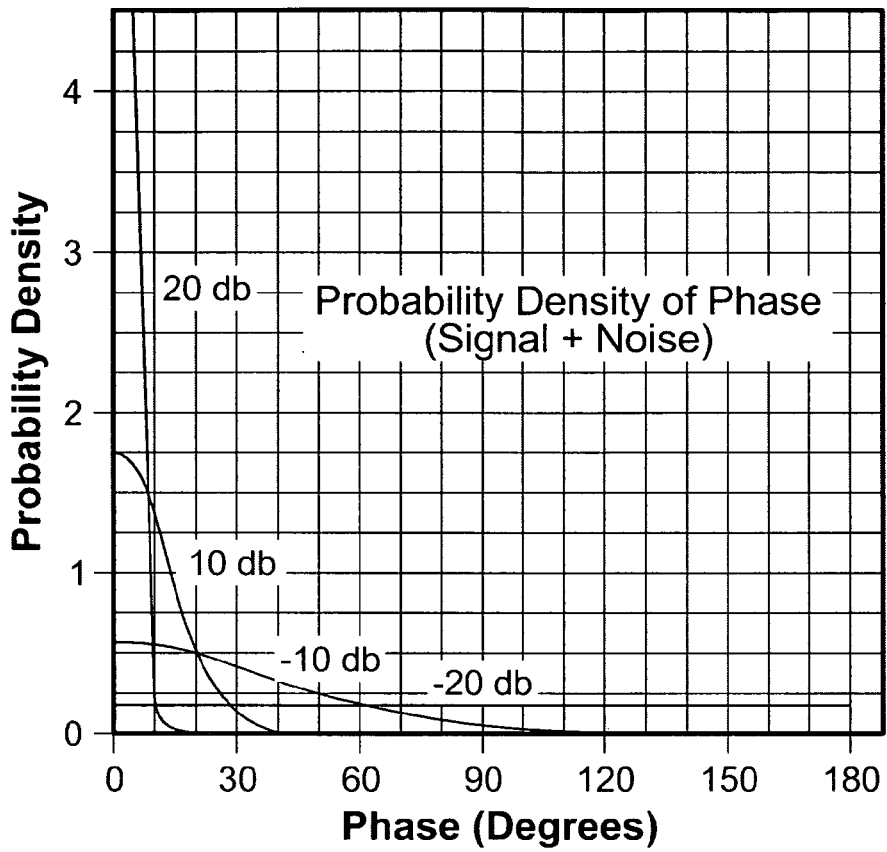
FIG. 9(*a*) is collection of four plots at four different S/N ratios illustrating computer simulation results from the phase gate technique associated with FIGS. 8(*b*) and 8(*c*).
Figure 9C:
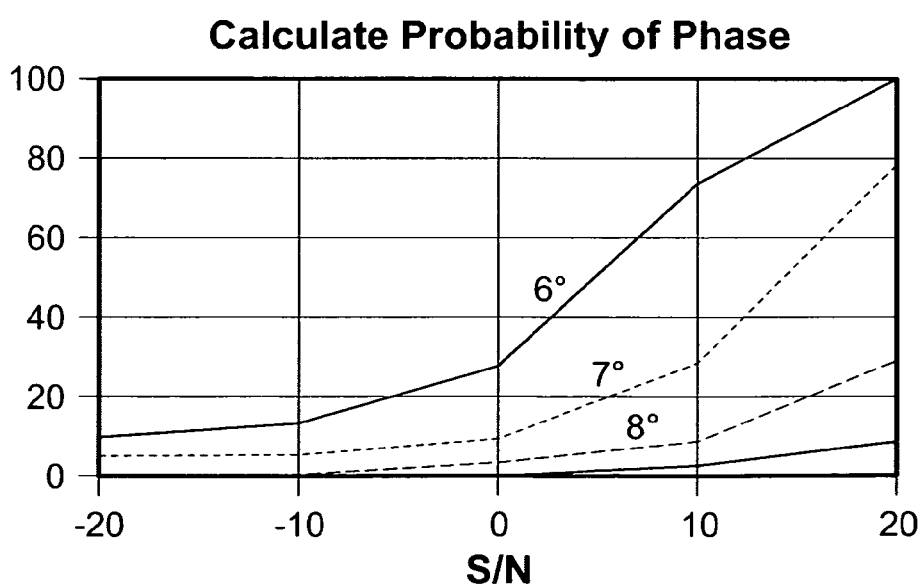

FIGS. 9(b) and 9(c) show the probability density for the phase of signal-plus-noise at various signal-to-noise ratios and illustrate the effect of transitioning from wide to narrow phase gating.

The density function is used to obtain the probability of passing a sample through the phase gate by integrating the density over the gate window using numerical computation. FIG. 9(c) shows the results for phase gate sizes of 3, 10 and 30 degrees, for various values of S/N.

The simulation illustrates a deficiency of phase gating, because the phase multiplication takes place about point 0 rather than point X, as illustrated in FIG. 7.

If the phase multiplying takes place about point 0, the "phase gating" acts on the combined sine wave, degrading the S/N because of a disproportionate loss of signal. As a consequence, array enhancement can only be achieved for relatively high effective S/N ratios, as is achieved with the present invention. Phase perturbation, Δφ, introduced by the noise will cause the S+N voltage to be phase rotated and, hence, fall off the peak response (or outside the gate for the rectangular gate example as described with reference to FIG. 8(b).

By way of further clarification, it is helpful to consider a signal whose angle of arrival is precisely at the peak of the enhanced array beam. By "phase gate" action, all "n" values of the signal will add in-phase after phase multiplication giving a maximum output signal. A concurrent noise voltage will, in general, be at a different starting phase than the signal. It may seem that the Δφ associated with this noise will be multiplied by "n" causing various noise phasors at the phase gate output. This does occur when no signal is present and the noise is reduced by the dispersion of the noise vectors.

However, when a signal is present, the conditions necessary to achieve S/N improvement do not apply. S/N improvement requires that the noise voltage phase move relative to that of the signal. Since a phase multiplier multiplies the Δφ, this might seem plausible. However, this would require that the superposition principle apply. Unfortunately, this does not apply because during phase multiplication, the Δφ's cannot be treated independently for the signal and for noise; rather the composite phase is multiplied and, thereafter, the phase due to noise and signal are not separately identifiable. The actual voltage available to the phase multiplier is the vector resultant of the signal-plus-noise. This is represented by a single waveform whose zero crossing has been shifted from that of the signal alone by an amount dependent on the noise, phase and magnitude.

Thus, the requirement becomes one of automatically finding point X for each sample. When the voltage representing the horizontal vector X is found, it can be subtracted so as to make the phase multiplication take place effectively about point O ("X" and "O" are now the same).

Methods of obtaining a significant number of appropriate signal and noise samples will be described later. These are used for estimating the signal (i.e., vector O-X) for each noise (plus signal) which is the essence of the S/N reduction portion of the present invention. Under these circumstances, the phase gate analogy is valid and the representation for gate formation from one or two array dimensions, as shown in FIG. 15, apply.

The following is a description of the S/N enhancement portion of the present invention.

Formatting the Antenna Elements to Provide Software Inputs

An important requirement of the S/N enhancement portion of the present invention is to arrange the digital outputs of the array elements to serve as suitable inputs to the overall software processing scheme.

The ultimate role of the software is to minimize the noise component of the average of several voltages, each consisting of signal and noise, that are appropriately chosen from a larger array, as described below.

A 3×7 array configuration in accordance with the present invention is shown in FIG. 10 with corresponding elements (1-21) numbered as shown. The vertically aligned elements 10, 11, and 12 at the center of the seven columns constitute the virtual reference phase for the entire array; the rest of the elements form three separate groups. Each group includes three left vertical elements and three corresponding right vertical elements, i.e., the left and right elements are spaced equidistant from the center column, as indicated. The first group is the one with the greatest number of half wavelength, λ2, spacings between the left and right group and consists of elements 1, 2 and 3 on the left and 19, 20 and 21 on the right. Elements 7, 8, 9, 13, 14 and 15 form the left-right group with the least number of λ/2 spacings. The three different half-wavelength spacings of the groups result in ×1, ×2 and ×3 signal phase shifts for each group respectively and supply corresponding I and Q voltages. The I and Q voltages are eventually used to form the arctangent of Q/1 which is used for the phase multiplication function. This is done only after I and Q samples with very high S/N (i.e., low noise) have been achieved.

The voltage at each element consists of a desired signal portion and an unknown and unwanted noise portion. The first fundamental objective is to separate the "average signal" from the "average noise".

There are I and Q outputs created from each of the elements and these orthogonal components are treated independently (and can be processed in parallel to save processing time). The average I and Q values from each sextet can be readily obtained, however, these values contain both signal and noise. The six I, or six Q, values can be combined in pairs to afford more signal-plus-noise permutations to work with; (thus, in accordance with an embodiment of the invention), nine such pairs are formed. These nine pairs are completely correlated with the original six elements and, therefore, provide no noise reduction; however these pairs are used to formulate a (3×3) matrix which contains the information utilized in setting up a noise matrix for pattern recognition.

Each trial contains signal voltages for both an I or Q sextet; these voltages result from the angle of arrival of the signal combined with simulated random noise having typical probability density characteristic based largely on a Gaussian distribution. Of critical interest is the display of twenty-one numbered voltages at the upper middle of FIG. 10(b). This information is used to form a sextet for each separate trial group.

Index numbers, refer to the six, or more, element locations with respect to FIG. 10, used for that trial. A change indicator, R, is determined by using the I (or Q) value at the index where the minimum IA magnitude occurs and such index can be selected from within each sextet. R is defined as the I or Q entry at this index divided by actual I average (or Q average). The numerator and denominator of the ratio both contain signal as well as noise; however, values of R greater than 1 can be distinguished from R values less than 1; as the signal becomes greater, R becomes closer to 1 and the "greater than" and "less than" conditions become more difficult to distinguish. Use of "R" as a polarity change detector superceded by the Topological Change Sensor (TCS) network with it better ability to continue to sense all pertinent iterative changes.

The iterative process scheme consists of appropriate and prescribed steps that culminate in a substantial reduction of the average noise component of each trial. The fault-tolerant iterative sequence was simulated in various ways to arrive at a version that could be made to provide all of the desired characteristics. The resulting configuration, shown as FIG. 11, is effective and feasible from a reduction-to-practice standpoint.

The resulting configuration takes the form of a network or matrix of different plus and minus voltage injections applied (i.e., added algebraically) to appropriate I values. These include the average I and the I of minimum |IA|. One such matrix or number array is derived for each of the 2 or more same-phase groups, i.e., each group that has a different wavelength separation. Each of these groups provides a different signal voltage as determined by the trigonometry of the array outputs.

The "network" equivalent software is the outgrowth obtained from examining the "voltage added" aspects of different iterations of the process just described. Various voltage changes can dramatically change the scoring number, i.e., the percentage of correct vs. incorrect results. Different voltage values will affect some trials while leaving others with the same "score". This gives rise to the method of providing a series of predetermined voltages that had a progressively increasing value pattern. Negative values (of a corresponding pattern) provide a means of exploring (and establishing an all-inclusive capture of the "correct" result in one array of digital numbers (somewhat analogous to a map).

The network is referred to as a "Topological Number Array" since it is a topographical map of the location of all the pertinent digital values representing signal-plus-noise. The function of this portion is as a "change sensor" when provided with a variety of sequenced inputs from the iterative sequence programmer. These inputs are utilized to cause an appropriate "column shift" as will be explained shortly.

The function described above is also referred to as a topographical change sensor (TCS). Each iterative step is performed by the injection of prescribed voltage increments from the iterative programmer. These result in changes to the noise averages. The selected process yields a result in which the algebraic sum of the incrementally introduced plus and minus voltage shifts obtained from each iteration closely approximate the magnitude and polarity of the original (but unknown) noise average (for each trial).

With the above consideration in mind, it should be perceived that there is a wide range of software techniques for carrying out the iterative process, each of which can optimize the number of iterations and interactions in the interest of efficiency and cost.

Near optimum software can result in a convergence leaving the residual noise as tabulated in FIG. 12 which shows the various voltage increments leading to substantially reduced noise averages as tabulated in the last column. The algebraic sum of these successive increments is shown in the chart and approximates the value of the original noise average for each trial.

Iterative Processing Importance & Objective

The iterative processing steps are a primary aspect of the invention. Offline processing is employed so bandwidth, and related performance, is not compromised. The result is a tolerable time delay. However, the near-real-time performance that results from the several iterations provides the means for overcoming the conventionally perceived notion that reduction in noise cannot be extended beyond that which is achieved by the simple averaging of trials. With the means provided by this invention this given approach, the noise contribution from each trial can be reduced to values arbitrarily close to zero.

The iterative process requires time (although minimal) to accomplish its objective. However, the results provide dramatic improvements in signal-to-noise ratio.

Theory of Operation of the Topographic Number Array

The theory of how the "topographic" configuration and its related polarity change sensing capabilities determine "noise value" changes of each and every trial will be described after a brief introduction about the characteristics of the method.

The conceptual basis of the overall method is an example of the use of numerical logic, (rather than more conventional equations) to describe functions. The method is based on examinations in terms of confirmations and contradictions that result from numerical actions. The reduction-to-practice of such a method lends itself to the use of multiple integrated "circuit functions on a chip", each providing a known, yet different, numerical impact.

The first numerical action consists of deliberately changing the polarity of the noise portion of the signal-plus-noise voltage of each and every trial. This forced change is accomplished by providing a series of contiguous voltage increments that span a range of about minus one volt (−1.0) to plus one volt +1.0) in contiguous increments on the order of 0.05 volts or less: These voltage injections force the change.

It should be apparent that there is much flexibility in the number of voltage increments and the "graduation" of their spacing. Further, they do not need to be equally spaced and the range can be easily expanded or compressed dependent on the A/D converter used. As each "trial" of signal-plus-noise is entered into this all-value series of columns, a network of trials, or matrix, is formed. The addition of the input voltage (signal-plus-noise) to that which is inserted into each column creates a "new average noise" for each column. As a consequence of these additions, there results one column in which the net polarity of the noise-only portion changes (because the voltage in that column is opposite that of the noise). While this is focused usually in a specific column, this condition can occur between adjacent columns (giving rise to interpolation). The location of such a column is unknown, but its identification is eventually revealed by the iterative process. In the meantime, the TNA serves as a change sensor.

The "noise model" used for the simulation of the "stream" signal-to-noise trials is based on generally accepted Gaussian type of probability density distributions as used in radar and communications receiving systems. While such distribution is significant in conventional real-time analytical treatments, the storage of non-real-time methods used here are less susceptible to the noise model. This is because the elimination of each noise sample is literally forced to a value that goes through zero as a point of inflexion.

To illustrate this, FIGS. 12(a) and 12(b) are constructed using the simulated values of the noise. (These are not available in practice but serve here merely to illustrate the nature and effectiveness of the array of columns to accurately "locate" the "correct" noise column within the iterative matrix.) The noise is obviously not available except in simulation for use in an example to confirm the results of the invention.

FIGS. 12(c) and 12(d) illustrate the results when signal-plus-noise values are used, which is what is available in practice. FIGS. 12(c) and 12(d) show the result for a 0 db signal-to-noise.

Topographic Number Array Function (A) General

In a sense the TNA provides a map to guide the actions of the iterative sequence programmer in arriving at the destination which is the value and polarity of the noise average for each trial. As with the map analogy it should be realized that a sequence of alternative routes can arrive at the same destination. In practice with the TNA these involve different ways of inputting the voltage injection sequences with the programmable memories, or PROMS. Such input methods are referred to as scans and FIG. 11(c) illustrates the normal regular and "reverse" combination or a more sophisticated "A" and "V" scans in 11 (d) that can improve the ability of the TNA as a change detector.

Figure 11A:
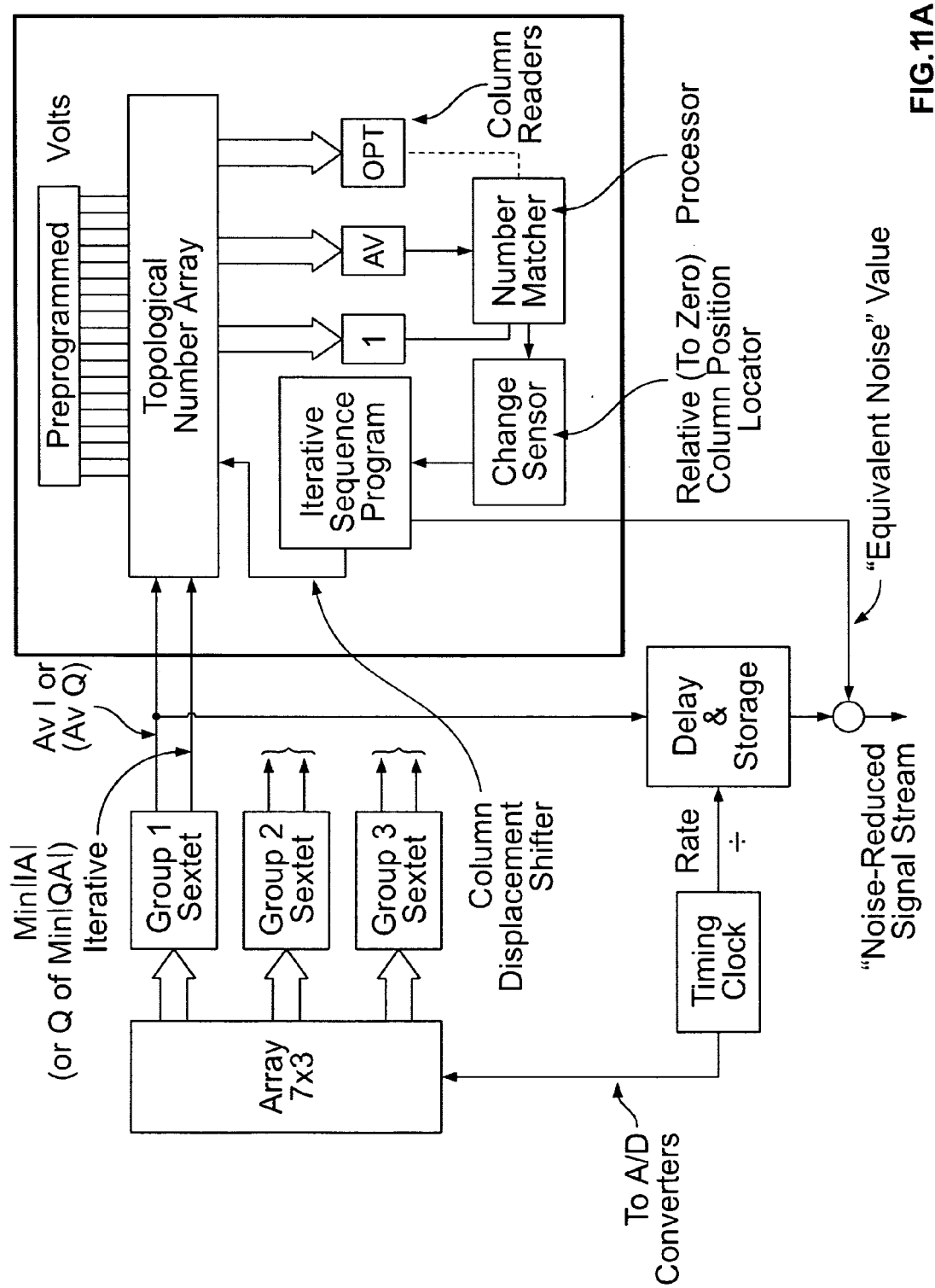
FIG. 11(a) is a block diagram of an iterative processing scheme including a Topographical Number Array which is used as a Topographical Change Sensor (TCS) in accordance with an embodiment of the invention.
Figure 11B:
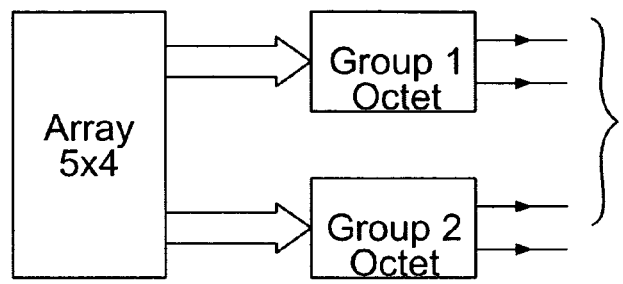
FIG. 11(b) is an alternative input stage similar to that shown in FIG. 11(a) except using a 5×4 array and octets instead of sextets.
Figure 11C:
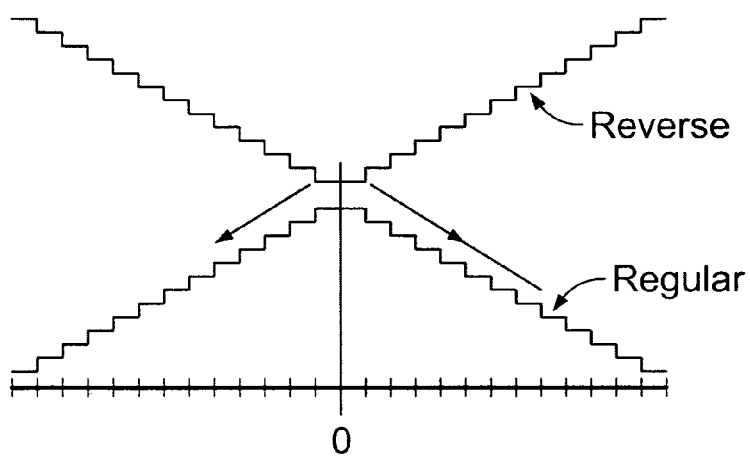
FIG. 11(c) illustrates a method of inputting preprogrammed voltages in "Regular"and "Reverse" scans in accordance with the present invention.
Figure 12E:
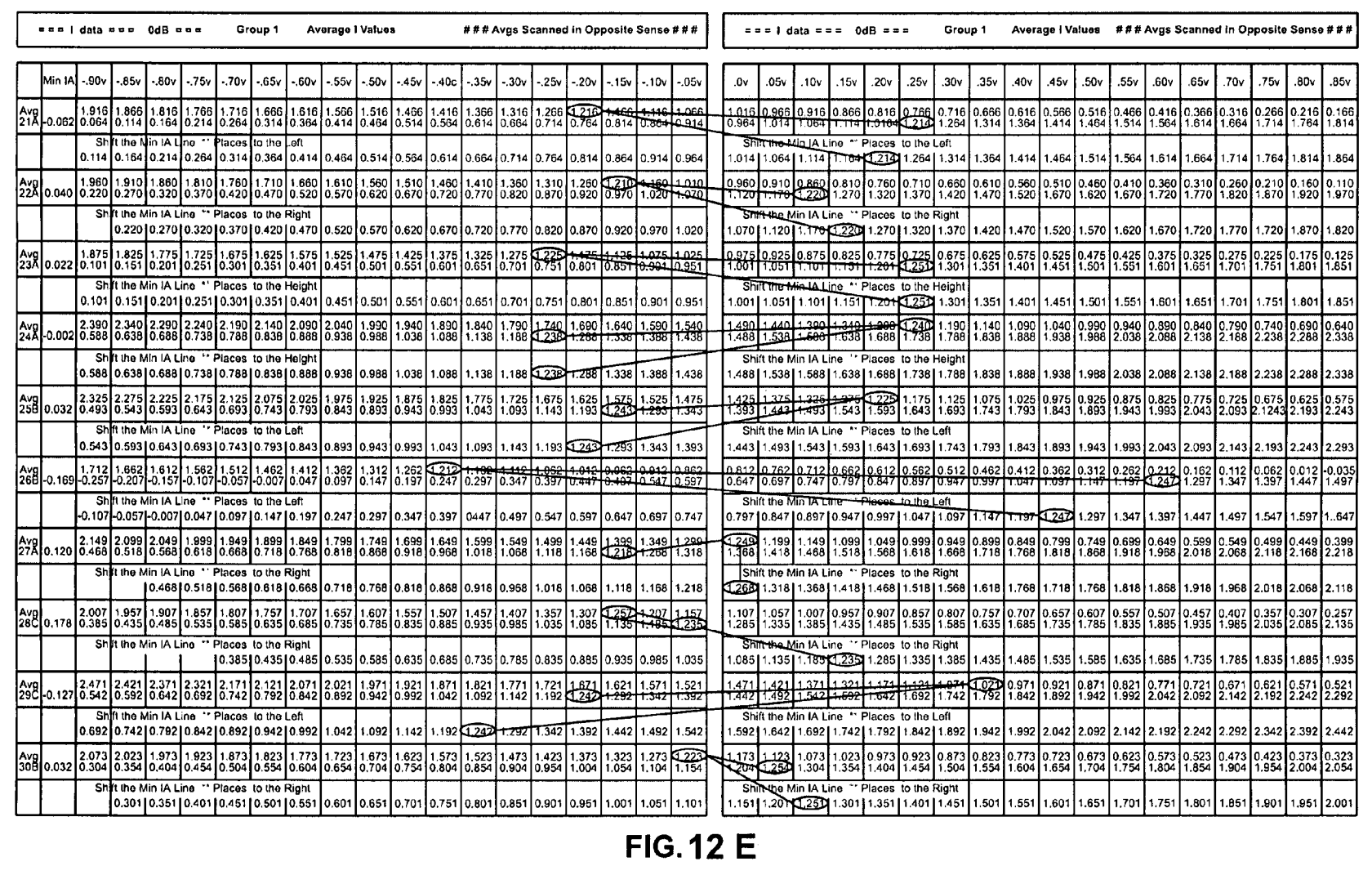

FIG. 12(e) is a composite of the information shown in FIG. 11(c), which is on the left side of 12(e), and 12(d), which is on the right side of 12 (e). However, FIG. 12(e) contains an additional row of information for each trial. This is a special figure which illustrates the reason that the Iterative Sequence Program translates its instructions in the form of a column displacement or a shift to the right, or left, depending upon whether a plus or minus change is commanded. The shift column displacements corresponds to a number of column equivalents. This is determined by dividing the voltage, in this case the value of |IA| minimum shown at the left for each trial, by the column spacing increment (in this case, 0.05 volts).

The number of column shifts for the minimum |IA . value is shown by the discrete number on the line between the second and third rows.

One of the salient observations to be made is that such a shift causes symmetry of the matches between the left value with the corresponding right value about the zero column which is the topocentric point of the total topographical display. Without the shift, there is a right side or a left side bias for each trial.

With zero as the reference entry for the first iteration, the column shift from the iterative sequence programmer adds a plus or minus (right or left) additional shift to the shift that already prescribed to the minimum |IA| value column shift already taken. The asymmetry that occurs as a result serves as a polarity sensor about zero. Additional voltage commands, in the form of right or left column shifts, continuously change the asymmetry as will be explained in the next section which explains the details of the steps taken.

(B) Specific Steps

The first iterative step establishes the initial condition which uses the "zero" column in the average row as a starting point. Subsequent steps use the new column location after the first iteration to become the new reference column (in the average row) for the following steps. These functions are as follows:

1. Processes off-line to capture, store, and provide an extensive range of digital signal-plus-noise values which are presented as the Topographical Number Array.
2. Revises (updates) these as induced by inputs from the iterative sequence program (the "preprogrammed voltage values" remain constant). The iterative voltage changes are controlled as described in the "illustrative sequence of iterative programmer".
3. An initial entry reading is obtained from the top or "average" row at the zero column (this entry corresponds to the actual signal-plus-noise from average of a corresponding sextet.
4. A value of the same magnitude is selected from another second row (the minimum |IA| row) by the processor and the corresponding column location is noted. This constitutes a match as provided by a number matcher and need not involve equality sensing.
5. Starting at the new column and row of the output of the Column Displacement Shifter, the iterative voltages are translated into a corresponding number of columns. The resulting voltage reading is a signal-plus-noise at the new column is matched with row 1 (the average) to produce a new row 1 (average) and column. This can be done by the equality sensor.
6. As a result, the "new" column location of the average row may shift from its original left or right location to the opposite (right to left) location. Such a change indicates a polarity change.

The above six steps establish a new reference from which to start and repeat steps 4, 5, and 6 using the new column starting location.

The "new" match that will occur between the "new average I value at its shifted column location in step 6 will provide in the average column row an indication (by column location) as to whether the column location has:

(a) become nearer to zero, or
(b) become farther from zero, or
(c) gone through zero indicating a polarity reversal This information is the type needed to guide the iterative feedback process.

Figure 11D:
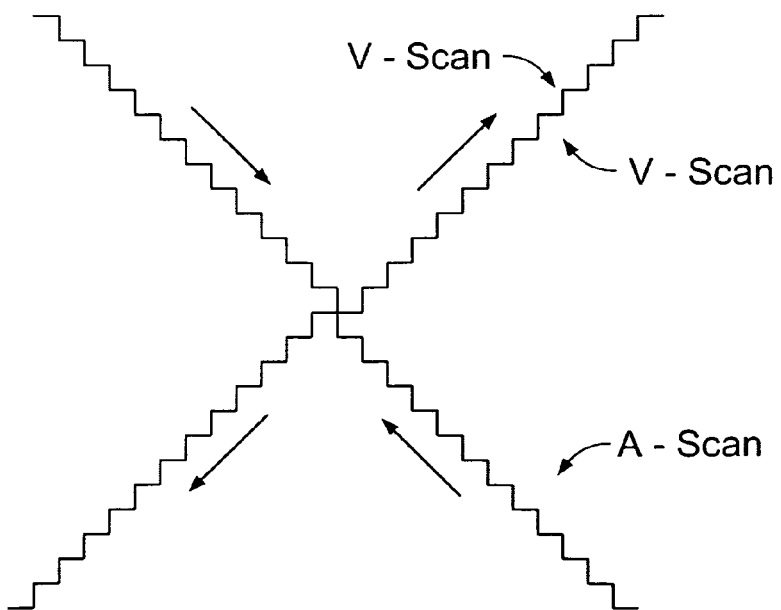
FIG. 11(d) illustrates a method of inputting preprogrammed voltages in "A" and "V" scans in accordance with the present invention.

To extract the information (as to column choice) it is important that the voltage information be introduced or "scanned" into the iterative matrix in a manner that will produce a "proper error sense" when making voltage comparison between entries from two appropriate columns. The pertinent columns are either of the first or second trials and the average of these two trials. To accomplish this, the "average row" is scanned (i.e., the voltages introduced) in a minus to plus manner which is the opposite of that used in trial 1 and trial 2. This insures that the error sense at the different "zero noise transition points" are opposite rather than "parallel", i.e., having like slopes as illustrated in FIGS. 11(c) and 11(d).

Variations include V scans and A scans that permit the scanning directions to be opposite on the right from the that of the left (and vice versa).

Some trials were made with slightly difference but equally spaced voltage increment on the right from those of the left given rise to the potential for applying Vernier principles to obtain closer readings.

The ultimate improvement in noise reduction will be limited by the ability to measure the voltages from the pertinent antenna elements. Such precision will depend upon the mechanical "accuracy" of the array. Since the array can be designated and manufactured by numerical controlled (especially for relatively "small" antennas) the potential for improvement is large. The digital nature of the electronic process will preserve the precision of the antenna outputs. The improvement is estimated to be in the 30-40 db.

Illustrated Sequence of Iterative programmer

The incremental voltages used in iterations 2 and 3 are selected to help sort out the large noise values from the lower noise values. When these voltages are made to be the same magnitude, the following results: if the polarity remains the same for both iterations 2 and 3 (as when the amount of noise is large), the two appropriate polarities are the same and the two voltages will be added so that twice the increment will be effective at the end of the 3 iterations. Conversely, if the sign changes between steps 2 and 3, the net effect will be zero, yielding the same result as at the end of iteration 3 as that at the end of iteration 1, i.e., no change. The additive condition (either both plus or both negative indicates a relatively large noise that will require more like polarity increments to reduce it. On the other hand, the reversion to iteration 1 will indicate a relatively small noise (below about 0.25) for which a series of oscillating polarities is appropriate for the convergence to a very low value. Accordingly, the pattern of the appropriate incremental changes is established at the end of step 3. During latter iterative steps, the magnitude of the voltage increments of suitable polarities are reduced progressively (by factors of 2, for instance).

Access Key Analogy

It is hoped that the information locked in the TNA could be retrieved from the pertinent column (where the relative position corresponds to the noise magnitude and sign) could be unlocked by a clever "access key". The workings of the iterative process proved to be such a key. Rather than being like a mechanical key that activates the tumbler. The iterative process "key" is more analogous to a combination lock in which the tumblers are accessed in a serial manner, thus achieving the right combination.

While most of the explanation has centered around a 7×3 array, one attractive alternative is a 5×4 array. As a consequence, a 5×4 array, consisting of 4 vertical elements formed into 2 groups at wavelength spacing and consisting of 4 left and 4 right elements in each group is shown in FIG. 11. Thus, an octet replaces the sextet to provide the average I (or Q) and the I (or Q) of the minimum IA or QA. Shown as FIG. 11(b), a 5×4 array is more symmetrical and is more appropriate for communications applications.

Near optimum performance can result in convergence and residual noise as tabulated in FIG. 13, which shows the various voltage increments leading to substantially reduced noise averages tabulated in the right-most column.

Phase Multiplication Process for Beam Sharpening with S/N Realization (Amplitude)

The I and Q "noise-purged" signals are used to form the arctangent of Q/I, an angle used in the phase multiplication function. This is done after the I's and Q's of very low noise have been achieved through the iterative processing. Without this achievement the phase multiplying process would not perform its intended function.

Under the above circumstances, the performance comparison when using an antenna array configured in accordance with the present invention is shown in FIGS. 13(a), I data, and 13(b), Q data.

FIGS. 14(a) and 14(b) illustrate the dramatic improvement potential. The improvements afforded by the present invention are highlighted by the normalization of its results to an equivalent 210 element array. This is for a phase multiplier from 1 to 10 (i.e., ×2, ×3, ×4 ... ×10). Results are also shown for the original 21 element array (21 elements are divided into 3 groups of 7 each in the simulated example). The 3 groups act to improve the reduction of external interference.

There is a new voltage vector created at each new phase resulting from each multiplication of the basic angle. This basic angle is the arctangent of "a noise-purged Q" divided by "noise-purged I". The magnitude of each new vector is the square root of the squared Q and the squared I and is constant for each vector created by the phase multiplication. Each new vector is resolved into new Q and new I components.

The basic angle (arctangent of Q/I) is determined by the angle of arrival of the plane wave of the signal with respect to the array normal. This yields different angles φ at different actual angle θ, measured from the normal, giving rise to the slope of response with respect to the 0=o peaks.

Figure 15A:
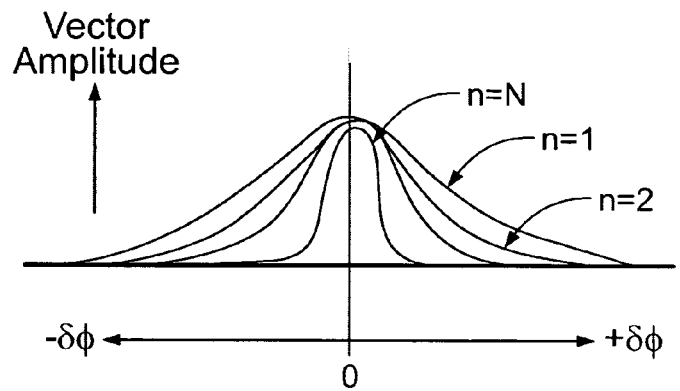
FIG. 15(a) is a graph illustrating the effects on the signal vector amplitude response vs. the directional phase (theta) angle in accordance with the invention.
Figure 15B:
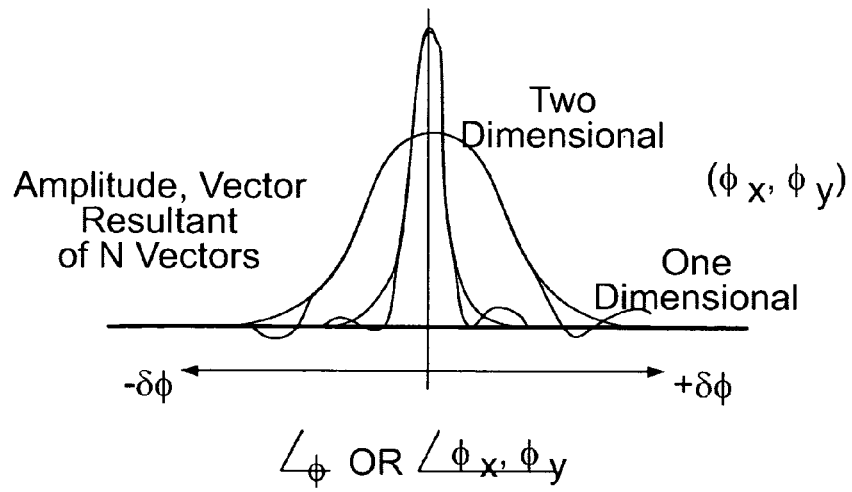
FIG. 15(b) is a graph illustrating the effects on the signal vector amplitude response vs. phase angle (theta) on a two dimensional basis.
Figure 15C:
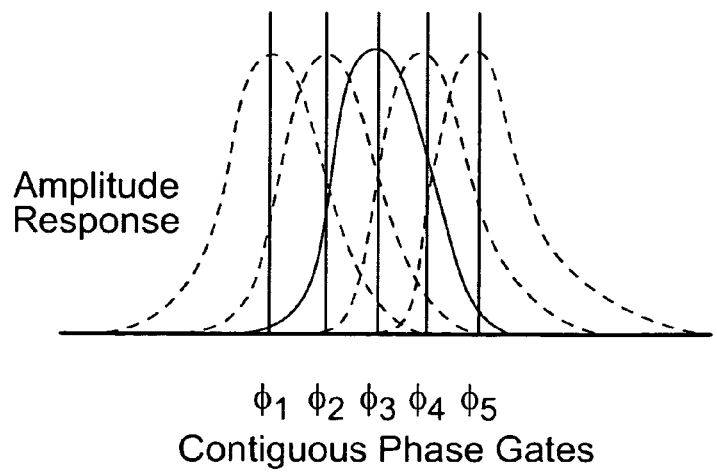
FIG. 15(c) is a graph illustrating the effect on signal vector amplitude response vs. phase as a function of additional contiguous phase gates.

It should be recognized that the response pattern of FIGS. 15(a)-15(c) is analogous to a practical "phase-gate". The great reduction of thermal noise affected by the processing of the present invention has overcome phase gate shortcomings described in connection with FIG. 9.

What is claimed is:

1. A circuit operable to perform a method of improving an angular resolution in a receive system, said method comprising:

aggregating signal-plus-noise data output from an antenna into a plurality of groups, each group containing data having a similar phase, wherein the phase corresponding to each group is a multiple of the phase corresponding to the other groups, said multiple being determined by a spacing between right and left elements of each group from the center of the antenna array and wherein further, said groups are formed by combining data from respective right and left antenna elements and said right and left antenna elements are equidistant from a central common reference located at a center of the array of elements and corresponding to a phase angle, phi, of zero phase; and iteratively processing the data in said group to reduce a noise portion of a signal plus noise average to determine a relatively noise-free representation of the angle, phi, associated with an arrival direction of the signal from said group by aggregating modified quadrature data (Q) and aggregating in-phase data (I) and dividing the overall digital net values of plus and minus quadrature data by the net in-phase value to determine an angle from the arctangent of each Q/I quotient.

2. A circuit operable to perform a method of improving an angular resolution in a receive system, said method comprising:

aggregating signal-plus-noise data output from an antenna into a plurality of groups, each group containing data having a similar phase, wherein the phase corresponding to each group is a multiple of the phase corresponding to the other groups, said multiple being determined by a spacing between right and left elements of each group from the center of the antenna array and wherein further, said groups are formed by combining data from respective right and left antenna elements and said right and left antenna elements are equidistant from a central common reference located at a center of the array of elements and corresponding to a phase angle, phi, of zero phase;

phase multiplying said angle, phi, from each group; and processing vectors resulting from said phase multiplying, wherein improved angular discrimination against signals from unwanted angle directions outside a resultant sharpened beam results.

3. A circuit used for improving the signal-to-noise ratio of signals including a signal portion and a noise portion and which are received in a wireless communication system, the device comprising:

means for forming a topological number array (TNA) corresponding to one or more samples of the received signals;

means for digitally processing the TNA at at least one of the carrier frequency and an intermediate frequency corresponding to the frequency of the received signals and establishing an estimated magnitude and polarity of the noise associated with each sample of the received signals; and means for subtracting each established noise estimate from its respective sample of the received signals, wherein the subtracted noise estimate includes an appropriate carrier frequency phasing to account for the time required for the digital processing.

4. A circuit as recited in claim 3 further comprising means for determining an optimum noise estimate for each sample of the received signals, wherein an optimum estimate occurs when an actual signal cycle of a respective received signal most closely matches a corresponding one or more reference cycle comprising surrogate sinusoidal cycles generated by iteratively adding different incremental preassigned values to the respective received signal.

5. A circuit device as recited in claim 4 wherein said means for determining operates on a plurality of the surrogate sinusoidal cycles in parallel.

6. A circuit for processing signals in a receive system, the device comprising:

means for aggregating a plurality of digital values, the digital values being used to modify an array comprising digital representations of the received signals, the aggregation being performed in several steps to form a near real time estimate of noise associated with the received signals; and means for identifying a particular entry of a subset of the aggregation that has the least absolute deviation from an average of the subset, wherein the identified entry is an entry whose noise is closest to the average noise component of a signal plus noise average of the aggregate group.

7. A circuit for processing signals in a receive system, the device comprising:

means for configuring a numerical array of modified signal-plus-noise values representative of the received signals such that each noise portion of the signal-plus-noise values transitions through zero at a location in the array, the location being determined by the polarity and magnitude of the noise; and means for sensing how the injection of a programmed iterative value will change a relative location within the array by sensing, in progressive steps, when each injected iterative value causes a match in the numerical values of signal-plus-noise from two rows of the numerical array to be further from, or closer to, a topocentric center of left and right portions of the array.

8. A circuit for processing signals in a receive system, the device comprising:

means for iteratively adding digital values to an array of stored digital information that represents a numerical array of signal-plus-noise digital values, wherein the array comprises initial values that are obtained from two or more trials including random noise values combined with two signal half-cycle values that are substantially equal to each other during these two trials and wherein the initial values comprise two or more respective successive samples sampled with respect to a phase reference of the system;

means for assigning the values added to be at least one of a signal value and a noise value; and means for extracting phase modulation data from a carrier signal, wherein the modulation is in the form of a sinusoidal pattern between two phase excursions accomplished by a pair of carrier instances that use the same phase reference for a plurality of such pairs which are used successively to reproduce the modulation from a series of frames of enhanced information.

9. A circuit as claimed in claim 8, further comprising means for performing nondispersive phase multiplication by scaler integers to achieve receive antenna patterns.

10. A circuit for processing signals in a receive system, the device comprising:

means for configuring a numerical array of modified signal-plus-noise values representative of the received signals such that each noise portion of the signal-plus-noise values transitions through zero at a location in the array, the location being determined by the polarity and magnitude of the noise;

means for sensing how the injection of a programmed iterative value will change a relative location within the array by sensing, in progressive steps, when each injected iterative value causes a match in the numerical values of signal-plus-noise from two rows of the numerical array to be further from, or closer to, a topocentric center of left and right portions of the array; and means for sensing iterative changes in a symmetrical fashion in the modified signal-plus-noise values by using plus or minus deviations nearest to the average.

* * * * *